US012778097B2

(12) United States Patent
Omura

(10) Patent No.: US 12,778,097 B2
(45) Date of Patent: Nov. 3, 2026

(54) FISHING ROD HANDLE AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 0 days.

(21) Appl. No.: 18/354,171

(22) Filed: Jul. 18, 2023

(65) Prior Publication Data

US 2024/0023529 A1 Jan. 25, 2024

(30) Foreign Application Priority Data

Jul. 22, 2022 (KR) ........................ 10-2022-0091026
Jun. 7, 2023 (KR) ........................ 10-2023-0072723

(51) Int. Cl.
*A01K 87/06* (2006.01)
*A01K 87/02* (2006.01)
*A01K 87/08* (2006.01)

(52) U.S. Cl.
CPC .............. *A01K 87/06* (2013.01); *A01K 87/02* (2013.01); *A01K 87/08* (2013.01)

(58) Field of Classification Search
CPC ......... A01K 87/06; A01K 87/08; A01K 87/00
USPC .......................................... 43/22, 23, 18.1 R
See application file for complete search history.

(56) References Cited

U.S. PATENT DOCUMENTS 553,725 A * 1/1896 Roll et al. .............. A01K 87/06 43/22
676,348 A * 6/1901 Bell ....................... A01K 87/06 43/22
887,437 A * 5/1908 Smith .................... A01K 87/06 43/22
1,591,122 A * 7/1926 Gephart ................. A01K 87/06 43/22
1,641,226 A * 9/1927 Kinnear ................. A01K 87/06 43/23

(Continued)

FOREIGN PATENT DOCUMENTS

CN 2698079 Y * 5/2005
CN 1720794 A 1/2006

(Continued)

*Primary Examiner* — Darren W Ark
(74) *Attorney, Agent, or Firm* — Oblon, McClelland, Maier & Neustadt, L.L.P.

(57) ABSTRACT

A fishing rod handle fixing a reel having front and rear legs is provided. The fishing rod handle includes a front coupling portion coupled to a rod body, a rear coupling portion coupled to a rear grip, a reel fixing portion defined between the front and rear coupling portions and fixing the front leg, a pressing mechanism, and a reinforcing member. The front and rear legs are seated on a seating portion of the reel fixing portion, and the seating portion is spaced downward from an upper end of the front coupling portion and an upper end of the rear coupling portion. The pressing mechanism is coupled to the reel fixing portion above the seating portion, and presses the rear leg against the seating portion. The reinforcing member is embedded in the reel fixing portion below the seating portion, and resists bending deformation of the reel fixing portion.

13 Claims, 22 Drawing Sheets

(56) References Cited

U.S. PATENT DOCUMENTS

| | | | | | |
|---|---|---|---|---|---|
| 1,661,868 | A * | 3/1928 | Armstrong | F16B 7/1472 | 24/DIG. 49 |
| 1,698,341 | A * | 1/1929 | Maury | A01K 87/06 | 43/22 |
| 1,711,248 | A * | 4/1929 | Powell | A01K 87/06 | 43/22 |
| 1,843,714 | A * | 2/1932 | Fuller | A01K 87/00 | 43/18.1 R |
| 1,909,529 | A * | 5/1933 | Gephart | A01K 87/00 | 43/22 |
| 1,994,449 | A * | 3/1935 | Burdick | A01K 87/06 | 43/22 |
| 2,057,535 | A * | 10/1936 | McKechnie, Jr. | A01K 87/08 | 43/22 |
| 2,111,080 | A * | 3/1938 | Stromgren | A01K 87/06 | 43/22 |
| 2,198,588 | A * | 4/1940 | Stephens | A01K 87/06 | 43/22 |
| 2,260,204 | A * | 10/1941 | Balz | A01K 87/08 | 279/76 |
| 2,421,240 | A * | 5/1947 | Camburn | A01K 87/08 | 43/22 |
| 2,422,084 | A * | 6/1947 | Dorner | A01K 87/08 | 248/222.13 |
| 2,424,430 | A * | 7/1947 | Beyer | A01K 87/06 | 43/22 |
| 2,456,681 | A * | 12/1948 | Culver | A01K 87/08 | 43/22 |
| 2,485,144 | A * | 10/1949 | Espenship | A01K 87/08 | 279/48 |
| 2,490,584 | A * | 12/1949 | Dunkelberger | A01K 87/06 | 43/22 |
| 2,495,980 | A * | 1/1950 | Meierjohan | A01K 87/08 | 43/22 |
| 2,498,648 | A * | 2/1950 | Christen | A01K 87/06 | 43/22 |
| 2,503,510 | A * | 4/1950 | Rives | A01K 87/06 | 43/22 |
| 2,504,801 | A * | 4/1950 | Carlson | A01K 87/08 | 43/22 |
| 2,526,080 | A * | 10/1950 | Mclane | A01K 87/06 | 43/22 |
| 2,546,559 | A * | 3/1951 | Nix | A01K 89/06 | 242/270 |
| 2,583,831 | A * | 1/1952 | Goergen | A01K 87/08 | 279/49 |
| 2,583,909 | A * | 1/1952 | Warth | A01K 87/08 | 43/22 |
| 2,593,747 | A * | 4/1952 | Godfrey | A01K 87/06 | 81/166 |
| 2,699,622 | A * | 1/1955 | Stevens | A01K 87/06 | 43/22 |
| 2,753,646 | A * | 7/1956 | Colmery | A01K 87/06 | 43/22 |
| 2,777,240 | A * | 1/1957 | Hutchison | A01K 87/06 | 43/22 |
| 2,839,863 | A * | 6/1958 | Heffel | A01K 87/06 | 43/22 |
| 2,911,750 | A * | 11/1959 | Garner | A01K 87/08 | 43/22 |
| 2,955,376 | A * | 10/1960 | Zeigler | A01K 87/06 | 43/22 |
| 3,068,603 | A * | 12/1962 | Zeigler | A01K 87/06 | 43/22 |
| 3,276,160 | A * | 10/1966 | Sarah | A01K 87/06 | 43/22 |
| 3,309,809 | A * | 3/1967 | Bowker | A01K 87/06 | 43/22 |
| 3,315,401 | A * | 4/1967 | Wagner | A01K 97/125 | 43/25 |
| 3,426,466 | A * | 2/1969 | Shepherd | A01K 87/08 | 43/22 |
| 3,461,594 | A * | 8/1969 | Ohmura | A01K 87/06 | 43/22 |
| 3,499,241 | A * | 3/1970 | Ruppa | A01K 91/065 | 43/19.2 |
| 3,570,165 | A * | 3/1971 | Murvall | A01K 87/06 | 43/22 |
| D228,759 | S * | 10/1973 | Ohmura | D22/142 | |
| 3,772,817 | A * | 11/1973 | Bowerfind | A01K 87/06 | 43/22 |
| 3,827,173 | A * | 8/1974 | Barnes | A01K 87/08 | 43/23 |
| 3,950,883 | A * | 4/1976 | Shepherd | A01K 87/08 | 43/22 |
| 4,026,060 | A * | 5/1977 | Barnes | A01K 87/06 | 411/969 |
| 4,237,640 | A * | 12/1980 | Sato | A01K 87/06 | 24/527 |
| D265,496 | S * | 7/1982 | McMickle | D22/142 | |
| 4,424,639 | A * | 1/1984 | Richardson | A01K 87/06 | 43/18.1 R |
| 4,439,945 | A * | 4/1984 | Chang | A01K 87/06 | 43/22 |
| 4,494,333 | A * | 1/1985 | Jacobson | A01K 87/06 | 43/22 |
| 4,528,769 | A * | 7/1985 | Yamamoto | A01K 87/06 | 411/338 |
| 4,554,755 | A * | 11/1985 | Hsu | A01K 87/06 | 43/22 |
| 4,601,127 | A * | 7/1986 | Maeda | A01K 87/08 | 43/18.5 |
| 4,648,195 | A * | 3/1987 | Kim | A01K 87/06 | 43/22 |
| 4,693,029 | A * | 9/1987 | Yamamoto | A01K 87/06 | 43/22 |
| 4,703,578 | A * | 11/1987 | Highby | A01K 87/00 | 43/18.5 |
| 4,726,139 | A * | 2/1988 | Tokuda | A01K 87/06 | 43/22 |
| 4,750,287 | A * | 6/1988 | Myers | A01K 87/007 | 43/18.1 R |
| 4,860,484 | A * | 8/1989 | Green | A01K 87/06 | 43/18.5 |
| 4,962,608 | A * | 10/1990 | Loomis | A01K 87/00 | 43/18.1 R |
| 5,481,820 | A * | 1/1996 | Ohmura | A01K 87/06 | 43/22 |
| 8,919,030 | B2 * | 12/2014 | Zuckerman | A01K 87/06 | 43/22 |
| 9,807,988 | B2 * | 11/2017 | Westerfield | A01K 87/06 | |
| 11,445,712 | B2 * | 9/2022 | Rabbitt | A01K 87/06 | |
| 2011/0239518 | A1 * | 10/2011 | Zuckerman | A01K 87/06 | 43/22 |
| 2015/0181851 | A1 * | 7/2015 | Akiba | A01K 87/06 | 43/22 |
| 2015/0181852 | A1 * | 7/2015 | Akiba | A01K 87/06 | 43/18.5 |
| 2021/0222712 | A1 * | 7/2021 | Waldorf | A01K 87/06 | |
| 2021/0259226 | A1 * | 8/2021 | Rabbitt | A01K 87/08 | |
| 2023/0263146 | A1 * | 8/2023 | Kaneko | A01K 87/06 | 43/22 |
| 2024/0023530 | A1 * | 1/2024 | Kaneko | A01K 89/01925 | |
| 2025/0064038 | A1 * | 2/2025 | Kaneko | A01K 87/06 | |

FOREIGN PATENT DOCUMENTS

| | | | | | |
|---|---|---|---|---|---|
| CN | 101461353 | A | | 6/2009 | |
| CN | 201315802 | Y | | 9/2009 | |
| CN | 203709090 | U | | 7/2014 | |
| CN | 105165749 | A | | 12/2015 | |
| CN | 105889622 | A | | 8/2016 | |
| CN | 110999879 | A | | 4/2020 | |
| CN | 211048221 | U | * | 7/2020 | |
| CN | 113994939 | A | * | 2/2022 | A01K 87/06 |
| CN | 216931512 | U | * | 7/2022 | |
| DE | 967061 | C | * | 9/1957 | |
| DE | 1813561 | A1 | * | 7/1969 | |

(56) References Cited

FOREIGN PATENT DOCUMENTS

| | | | | | |
|---|---|---|---|---|---|
| FR | 939660 | A | * | 11/1948 | |
| GB | 635254 | A | * | 4/1950 | |
| JP | 49-46557 | Y | | 12/1974 | |
| JP | S6187066 | U | * | 6/1986 | |
| JP | 2-174624 | A | | 7/1990 | |
| JP | H059272 | U | * | 2/1993 | |
| JP | H0626154 | Y2 | * | 7/1994 | |
| JP | H08129 | A | * | 1/1996 | |
| JP | 3174510 | B2 | * | 6/2001 | |
| JP | 2001352866 | A | * | 12/2001 | |
| JP | 2004-261072 | A | | 9/2004 | |
| JP | 2004254592 | A | * | 9/2004 | |
| JP | 2004321086 | A | * | 11/2004 | |
| JP | 2005-204618 | A | | 8/2005 | |
| JP | 2007-6802 | A | | 1/2007 | |
| JP | 3888406 | B2 | * | 3/2007 | |
| JP | 2007125046 | A | * | 5/2007 | |
| JP | 2007202402 | A | * | 8/2007 | |
| JP | 3969540 | B2 | * | 9/2007 | |
| JP | 2009296989 | A | * | 12/2009 | |
| JP | 2010172308 | A | * | 8/2010 | |
| JP | 3167060 | U | * | 4/2011 | |
| JP | 2016192953 | A | * | 11/2016 | ............. A01K 87/06 |
| JP | 2018-93745 | A | | 6/2018 | |
| JP | 2020058345 | A | * | 4/2020 | ............. A01K 87/06 |
| JP | 6739116 | B1 | | 8/2020 | |
| JP | 3230440 | U | | 1/2021 | |
| JP | 6824046 | B2 | | 2/2021 | |
| JP | 2022-24540 | A | | 2/2022 | |
| KR | 2003-0030915 | A | | 4/2003 | |
| KR | 20060043762 | A | * | 5/2006 | |
| KR | 20060106600 | A | * | 10/2006 | |
| KR | 20150077325 | A | * | 7/2015 | |
| KR | 10-2062710 | B1 | | 1/2020 | |
| KR | 10-2023-0054378 | A | | 4/2023 | |

* cited by examiner

FISHING ROD HANDLE AND FISHING ROD INCLUDING SAME

CROSS-REFERENCE TO RELATED APPLICATIONS

This application is based upon and claims the benefit of priorities from Korean Patent Application No. 10-2022-0091026, filed on Jul. 22, 2022, and Korean Patent Application No. 10-2023-0072723, filed on Jun. 7, 2023, the entire contents of which are incorporated herein by reference.

TECHNICAL FIELD

The present disclosure relates to a fishing rod handle for fixing a reel and a fishing rod including the same.

BACKGROUND

A reel on which a fishing line is wound is installed on a rod body of a fishing rod. The reel is installed on the rod body of the fishing rod by a tool which is capable of fixing the reel and is attached to the rod body.

As an example of the tool for fixing the reel, a pipe reel seat having a pipe shape is known in the technical field. The pipe reel seat has a through-hole that is perforated in a longitudinal direction of the pipe reel seat from a front end of the pipe reel seat to a rear end of the pipe reel seat. The rod body of the fishing rod is inserted into and coupled to the through-hole of the pipe reel seat, attaching the pipe reel seat to the rod body. The pipe reel seat fixes the reel on an upper surface of the pipe reel seat.

An offset handle, which is another example of the tool for fixing the reel and can be used as a handle of a fishing rod, is known in the technical field. The offset handle can be used in fishing where a double-axis reel is used, and functions to fix the double-axis reel. Anglers who fish by casting a lure prefer the offset handle.

When viewing the offset handle from a lateral side thereof, a portion of the offset handle fixing the reel is formed so as to be concave downward with respect to a portion of the offset handle coupled to the rod body. That is, when viewing the offset handle from a lateral side thereof, the offset handle has an offset structure which is concave downward from an upper end. For the offset structure, the offset handle does not have a through-hole such as the aforesaid through-hole of the pipe reel seat. Therefore, the offset handle has a structure different from that of the pipe reel seat. Further, because of the offset structure of the offset handle, the offset handle has a reel fixing structure different from that of the pipe reel seat.

FIG. 1 is a side view showing a fishing rod to which an offset handle according to a prior art technique is attached, and FIG. 2 is a side view showing an example where the fishing rod shown in FIG. 1 is bent by a load during fishing. Reference is made to FIGS. 1 and 2 with regard to the offset handle according to the prior art technique.

An offset handle 100 is coupled to a rod body 210 of a fishing rod 200. A double-axis reel 230 for winding and releasing a fishing line 240 is attached to the offset handle 100. The double-axis reel 230 has a front leg 231 and a rear leg 232. The front leg 231 and the rear leg 232 function for attachment to the offset handle 100.

The offset handle 100 includes a handle body 110 that has a hood fixing the rear leg 232. Because of the offset structure, a portion of the handle body 110 located below the double-axis reel 230 has a thickness. The offset handle 100 fixes the front leg 231 by a pressing member 121 and a screw 122. The screw 122 penetrates through the handle body 110 from bottom to top and then is coupled to the pressing member 121. Therefore, a head of the screw 122 protrudes downward from a lower surface of the handle body 110. When an angler holds the offset handle 100, the head of the screw 122 inevitably comes into contact with the angler's index and middle fingers. Therefore, the angler has to fish while feeling an uncomfortable sense in the hand holding the offset handle 100.

As shown in FIG. 2, during fishing, a load is applied to fishing line guides 220, the rod body 210 and the double-axis reel 230 through the fishing line 240, and the rod body 210 is bent by the load. Further, as shown by an arrow A, the load applied to the double-axis reel 230 is applied to the handle body 110 of the offset handle through a tip of each of the legs 231 and 232, and the handle body 110 can be deformed by the load.

The handle body 110 of the offset handle does not have the aforesaid through-hole to be formed in the pipe reel seat. The rod body 210 does not penetrate through the handle body 110 of the offset handle. Therefore, due to the load applied during fishing, a portion of the handle body 110 that does not have a sufficient strength may be deformed, or may be broken by shear.

To prevent deformation or breakage of the handle body 110, the handle body 110 of the offset handle may be made of a metal material. However, the handle body made of a metal material increases the weight of the offset handle and gives an angler a cold feel in winter. To prevent deformation or breakage of the handle body, a thickness of a portion of the handle body located below the double-axis reel or a thickness of a portion of the handle body located near the hood may be increased. Further, a thickness of a portion of the handle body through which the screw 122 penetrates may be increased so that the portion of the handle body 110 through which the screw 122 penetrates is not deformed or broken by the load. However, the handle body having a thick portion makes it difficult for an angler to handle the offset handle.

SUMMARY

Disclosed embodiments provide a fishing rod handle that solves at least one or more of the aforementioned problems of the prior art technique. One embodiment of the present disclosure provides a fishing rod handle which is made of a resin material, has a light weight, and does not give an angler a cold feel in winter. One embodiment of the present disclosure provides a fishing rod handle which has a slim shape and a sufficient strength. One embodiment of the present disclosure provides a fishing rod handle which does not give an uncomfortable sense to an angler's finger. One embodiment of the present disclosure provides a fishing rod handle which can cope with the legs of various reels. One embodiment of the present disclosure provides a fishing rod which includes the above-described fishing rod handle.

One aspect of the disclosed embodiments relates to a fishing rod handle which constitutes a portion of a fishing rod and fixes a reel. A fishing rod handle according to one embodiment fixes a reel having a front leg and a rear leg, and can be coupled to a rod body and a rear grip. The fishing rod handle includes a front coupling portion, a rear coupling portion, a reel fixing portion, a pressing mechanism, and a reinforcing member. The front coupling portion is configured to be coupled to the rod body. The rear coupling portion is spaced apart from the front coupling portion in a longitudinal direction and is configured to be coupled to the rear grip. The reel fixing portion has a first seating portion on which the front leg and the rear leg are seated. The first seating portion is spaced downward from an upper side of the front coupling portion and an upper side of the rear coupling portion. The reel fixing portion is defined between the front coupling portion and the rear coupling portion, and is configured to fix the front leg. The pressing mechanism is coupled to the reel fixing portion above the first seating portion, and is configured to press and fix the rear leg to the first seating portion. The reinforcing member is embedded in the reel fixing portion below the first seating portion. The reinforcing member is configured to be continuous in the longitudinal direction and to resist bending deformation of the reel fixing portion.

In one embodiment, the reinforcing member may be a reinforcing pipe made of fiber-reinforced plastic.

In one embodiment, the reel fixing portion has an insertion hole perforated through the reel fixing portion in the longitudinal direction below the first seating portion, and the reinforcing member is configured to be inserted into and fitted to the insertion hole.

In one embodiment, the reel fixing portion has a front hood formed at a front end of the first seating portion and receiving the front leg, and the pressing mechanism has a rear hood spaced apart from the front hood in the longitudinal direction and receiving the rear leg. The reinforcing member has a length longer than a distance between a front end of the front hood and a rear end of the rear hood.

In one embodiment, the front coupling portion includes a front coupling hole which is formed rearward from a front end of the fishing rod handle and has a rear end forming a front end surface of the reel fixing portion. The rear coupling portion includes a rear coupling hole which is formed frontward from a rear end of the fishing rod handle and has a front end forming a rear end surface of the reel fixing portion. The reinforcing member has a length shorter than a distance between the front end surface and the rear end surface of the reel fixing portion.

In one embodiment, the pressing mechanism includes: a pressing member configured to press the rear leg against the first seating portion; and a pressing screw passing through the pressing member from top to bottom and fastened to the reel fixing portion to fix the pressing member to the reel fixing portion.

In one embodiment, the pressing member includes a pressing portion pressing the rear leg, and a rotary shaft portion disposed in a width direction orthogonal to the longitudinal direction. A passage hole through which the pressing screw passes is perforated through the pressing portion. The reel fixing portion includes a second seating portion and a slit portion. The second seating portion has a fastening hole, into which the pressing screw is fastened, and extends rearward from the first seating portion. The pressing member is seated on the second seating portion. The slit portion is located above the second seating portion. The rotary shaft portion is movably and rotatably fitted to the slit portion. The pressing member is coupled to the reel fixing portion so as to be rotatable about the rotary shaft portion between an open position where the pressing portion is spaced upward from the first seating portion and a closed position where the pressing portion presses the rear leg against the first seating portion.

In one embodiment, the pressing portion includes: a first lower surface capable of making contact with the first seating portion; a second lower surface bent upward with respect to the first lower surface; and a third lower surface which is bent downward with respect to the second lower surface, and in which a lower end of the passage hole is located. The second seating portion includes a first contact surface protruding and extending upward from the first seating portion, and a second contact surface which extends rearward from the first contact surface and in which an upper end of the fastening hole is located. The first contact surface is capable of making contact complementarily with the second lower surface of the pressing portion, and the second contact surface is capable of making contact complementarily with the third lower surface of the pressing portion.

In one embodiment, the fastening hole has a lower end which is spaced upward from the reinforcing member and is closed.

In one embodiment, the pressing screw includes a head portion and a shank portion. The head portion presses an upper surface of the pressing portion. The shank portion extends from the head portion and is coupled to the fastening hole. As the shank portion is coupled to the fastening hole by rotation of the pressing screw, the head portion presses the pressing portion, thereby fixing the pressing member to the reel fixing portion.

In one embodiment, the pressing screw has a head handle which is rotatably coupled to the head portion so as to be manipulated for the rotation of the pressing screw.

In one embodiment, an open angle of the pressing member at the open position is within a range of more than 0 degrees and equal to or less than 25 degrees with respect to the first seating portion.

In one embodiment, the reel fixing portion has a recess accommodating the pressing mechanism. The recess is recessed downward from the upper side of the front coupling portion and the upper side of the rear coupling portion.

In one embodiment, the front coupling portion, the rear coupling portion, and the reel fixing portion are integrally formed and are made of thermoplastic resin.

Another aspect of the disclosed embodiments relates to a fishing rod. The fishing rod according to one embodiment includes a rod body, the fishing rod handle according to the aforesaid embodiments, which is coupled to a rear end of the rod body, and a rear grip which is coupled to a rear end of the fishing rod handle.

In the fishing rod handle according to one embodiment, the pressing mechanism for pressing and fixing the leg of the reel is not disposed below the first seating portion, and the reinforcing member such as a pipe made of fiber-reinforced plastic is disposed inside the reel fixing portion below the first seating portion. Accordingly, the fishing rod handle according to one embodiment has a light weight and a slim shape, and can secure a sufficient strength that can prevent deformation or breakage by shear.

In the fishing rod handle according to one embodiment, the pressing mechanism is disposed on the upper side of the reel fixing portion, and can be configured as a compact device using the pressing member. Accordingly, the reinforcing member can be embedded in the whole of the reel fixing portion below the first seating portion, and the fishing rod handle can have a light weight, a slim shape, and a sufficiently secured strength.

In the fishing rod handle according to one embodiment, the pressing member of the pressing mechanism is opened upward by the rotation of the pressing member. Therefore, the fishing rod handle according to one embodiment can function to fix the legs of various reels.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
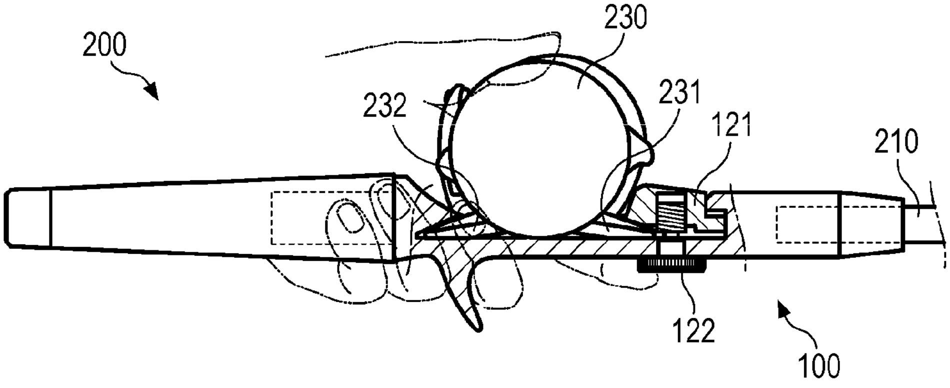
FIG. 1 (PRIOR ART)
FIG. 1 is a side view showing a portion of a fishing rod to which an offset handle according to a prior art technique is attached.
Figure 2:
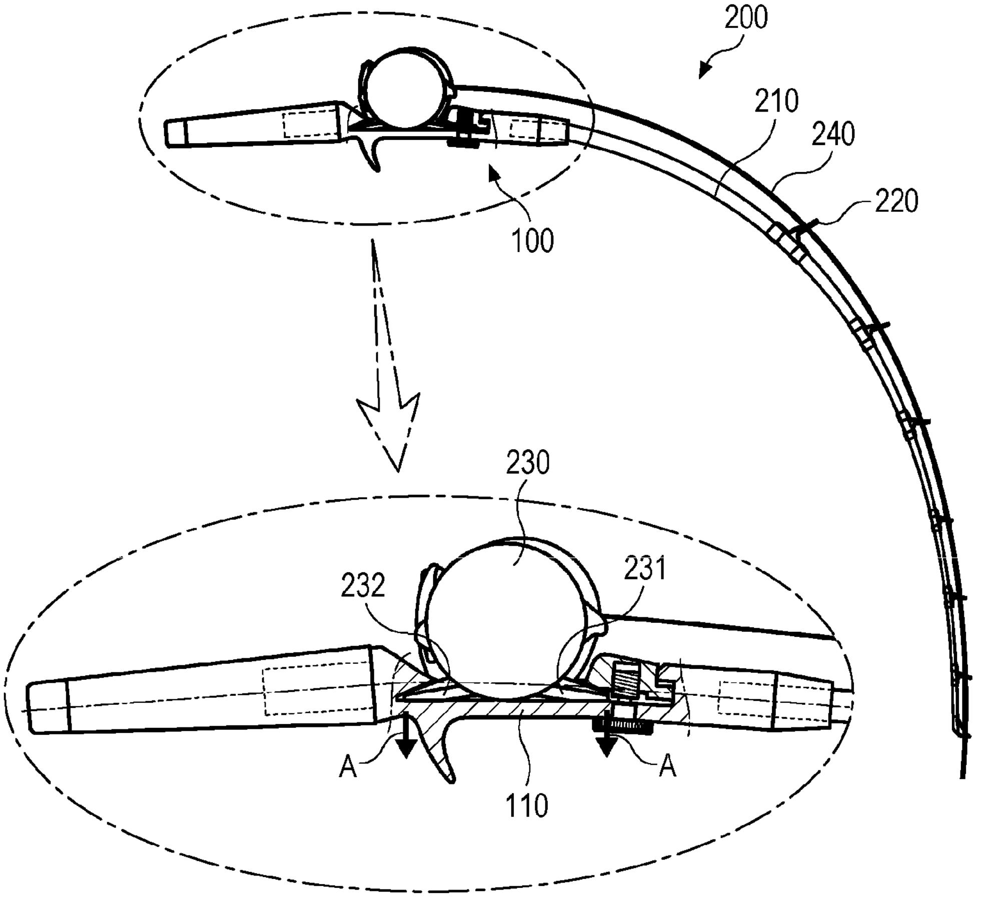
FIG. 2 (PRIOR ART)
FIG. 2 is a side view showing an example where the fishing rod shown in FIG. 1 is bent during fishing.

Embodiments of the present disclosure are illustrated for the purpose of explaining the technical idea of the present disclosure. The scope of the rights according to the present disclosure is not limited to the embodiments presented below or the detailed descriptions of such embodiments.

All technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

The expressions such as “comprising,” “including,” “having,” and the like used in the present disclosure are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will also apply to the singular expressions recited in the claims.

The expressions such as "first," "second," etc. used in the present disclosure are used to separate a plurality of elements from each other, and are not intended to limit an order or importance of the elements.

In the present disclosure, the description that one element is "connected" or "coupled" to another element should be understood to indicate that the aforesaid one element may be directly connected, or coupled, to the aforesaid another element, and should be further understood that the aforesaid one element may be connected or coupled to the aforesaid another element via a new element.

The dimensional and numerical values described in the present disclosure are not limited only to the dimensional and numerical values that are described herein. Unless specified otherwise, the dimensional and numerical values may be understood to mean the described values and the equivalent ranges including the values.

The directional terms "frontward," "front" and the like used in the present disclosure mean a direction directed toward a tip of a fishing rod, while the directional terms "rearward," "rear" and the like mean a direction directed toward a butt of a fishing rod. For example, an arrow FD shown in FIG. 3 indicates a frontward direction toward a tip of a fishing rod, while an arrow RD shown in FIG. 3 indicates a rearward direction toward a butt of the fishing rod. The directional terms "upward," "upper" and the like used in the present disclosure and the directional terms "downward," "lower" and the like used in the present disclosure are based on the upward side and the downward side in the accompanying drawings.

Hereinafter, the embodiments of the present disclosure are described with reference to the accompanying drawings. Like reference numerals in the accompanying drawings denote like or corresponding elements. Further, in the following description of the embodiments, redundant descriptions for the same or corresponding elements may be omitted. However, even if the descriptions of the elements are omitted, such elements are not intended to be excluded in any embodiment.

Figure 3:
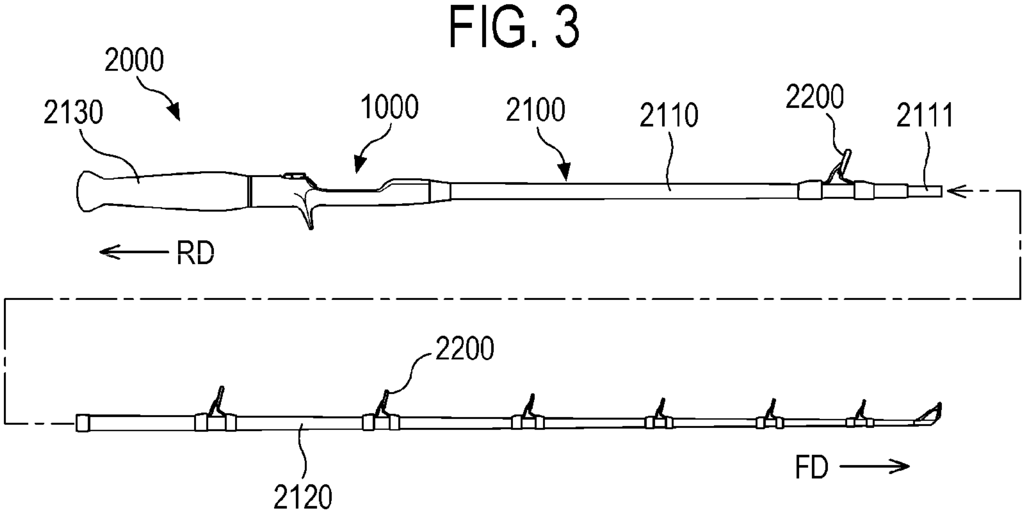
FIG. 3 is a side view showing a fishing rod according to one embodiment, which includes a fishing rod handle according to one embodiment.
Figure 4:
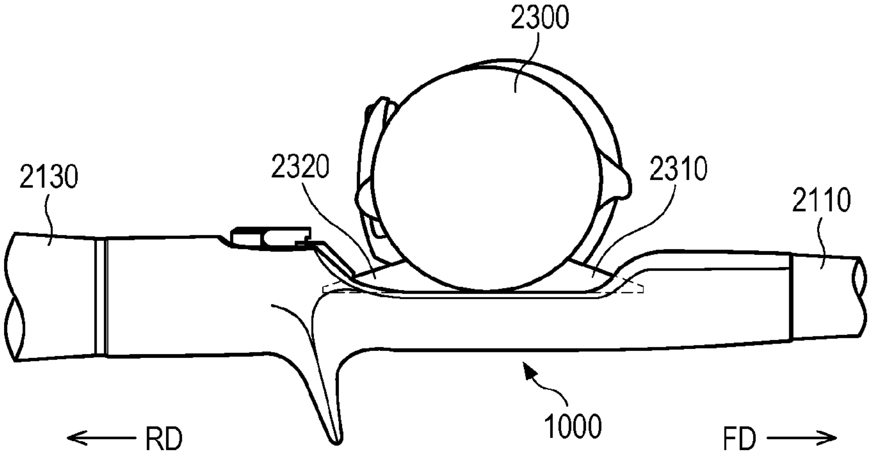
FIG. 4 is an enlarged view of FIG. 3 and shows that a reel is fixed to the fishing rod handle according to one embodiment.

FIG. 3 is a side view showing a fishing rod according to one embodiment, which includes a fishing rod handle according to one embodiment. FIG. 4 is an enlarged view of FIG. 3 and shows that a reel is fixed to the fishing rod handle according to one embodiment. Reference is made to FIGS. 3 and 4.

A fishing rod 2000 includes a rod body 2100 that is capable of elastically deforming during fishing and has a thin and long shape. The fishing rod 2000 may include a single rod body or a plurality of rod bodies. The rod body may be a pipe-shaped part or a cylindrical column-shaped part.

The fishing rod 2000 shown in FIG. 3 includes a first rod body 2110 and a second rod body 2120. By way of example, the first rod body 2110 and the second rod body 2120 may be connected in such a way that a rear end portion of the second rod body 2120 is fitted to a front end portion of the first rod body 2110. The first rod body 2110 may have a joint portion 2111 fitted to the rear end portion of the second rod body 2120. As another example, the fishing rod according to the embodiment may include a plurality of rod bodies connected in a telescopic manner.

The fishing rod 2000 may include a rear grip 2130 that forms a butt side portion of the fishing rod. An angler may grip the rear grip 2130 during fishing. The rear grip 2130 may be a portion of the rod body of the fishing rod.

The fishing rod 2000 may include a plurality of fishing line guides 2200 attached to the first rod body 2110 and the second rod body 2120. The fishing line guide 2200 may include a guide ring through which a fishing line can pass, and a frame supporting the guide ring and attached to the rod body. The fishing line guide 2200 guides the fishing line which is released from a reel when casting a fishing rig or is wound on the reel when landing a fish.

The fishing rod 2000 includes a fishing rod handle 1000 according to one embodiment of the present disclosure. The fishing rod handle 1000 may be connected, at its front end portion, to the rear end portion of the first rod body 2110, and the front end portion of the rear grip 2130 may be connected to a rear end portion of the fishing rod handle 1000. The fishing rod handle 1000 is configured to fix and support a reel 2300. An angler can manipulate the reel 2300 with one hand in the state where the angler holds the fishing rod handle 1000 with the other hand. Accordingly, the fishing rod handle 1000 functions as a part which the angler holds with a hand, and functions as a part for installing the reel to the fishing rod.

The reel 2300 is attached to an upper side of the fishing rod handle 1000. By way of example, the reel 2300 attached to the fishing rod handle 1000 may be a double-axis reel. In the double-axis reel, a rotary shaft of a spool for winding the fishing line is disposed so as to be orthogonal to the rod body, and the rotary shaft is supported on both sides thereof.

The reel 2300 has a pair of legs for attachment to the fishing rod handle 1000. As shown in FIG. 4, the pair of legs consist of a front leg 2310 and a rear leg 2320 which extend in opposite directions. The front leg 2310 extends in the frontward direction FD, and the rear leg 2320 extends in the rearward direction RD. The fishing rod handle 1000 releasably fixes the front and rear legs 2310 and 2320, thereby attaching the reel 2300 to the fishing rod handle 1000.

Figure 5:
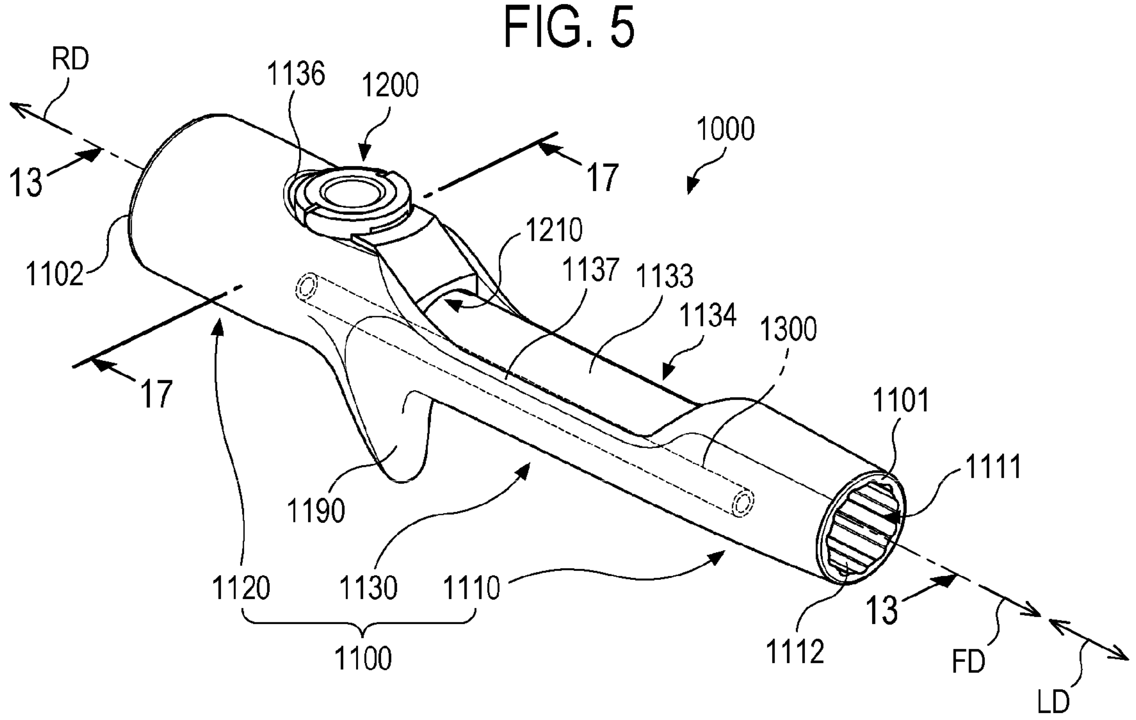
FIG. 5 is a perspective view showing the fishing rod handle according to one embodiment.
Figure 6:
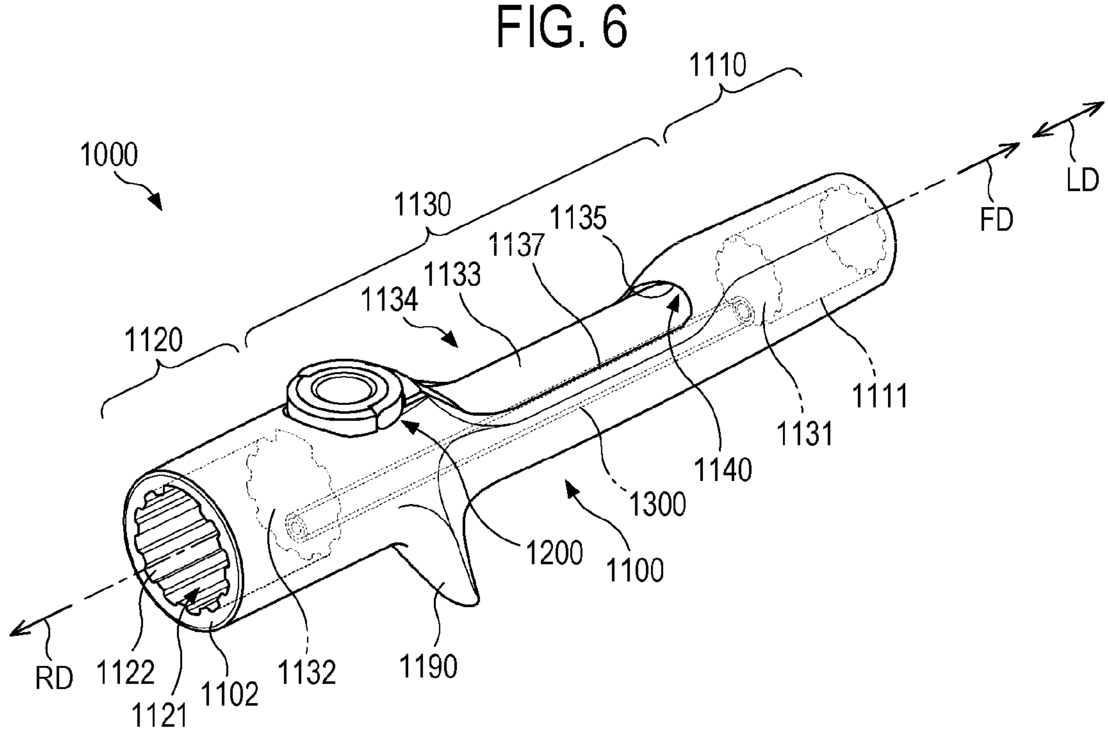
FIG. 6 is another perspective view showing the fishing rod handle according to one embodiment.
Figure 7:
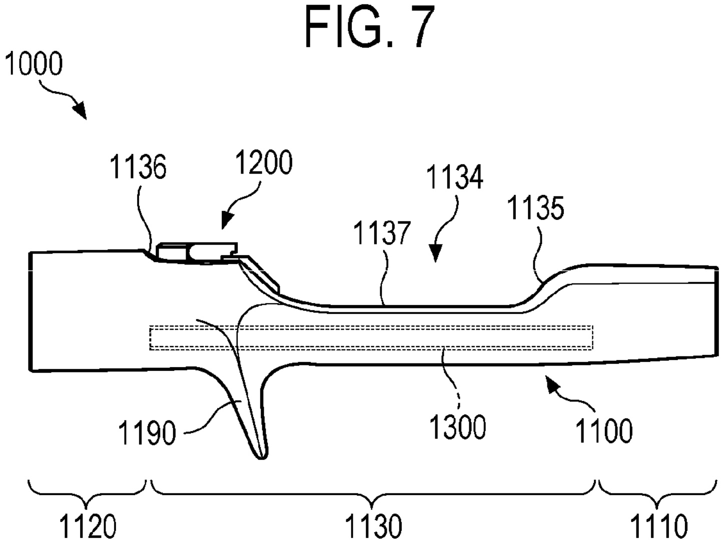
FIG. 7 is a side view of the fishing rod handle shown in FIG. 5.
Figure 8:
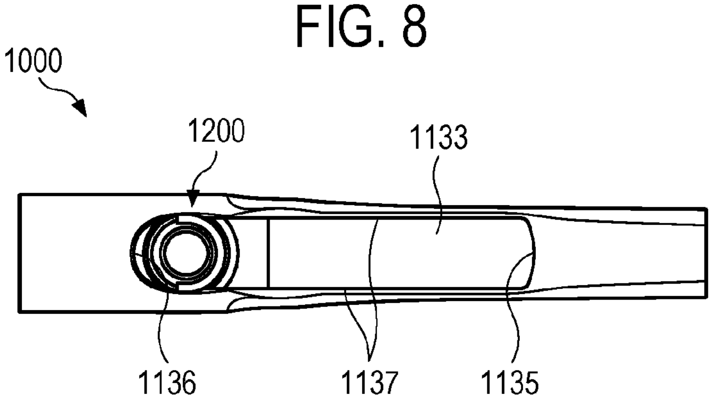
FIG. 8 is a top view of the fishing rod handle shown in FIG. 5.
Figure 9:
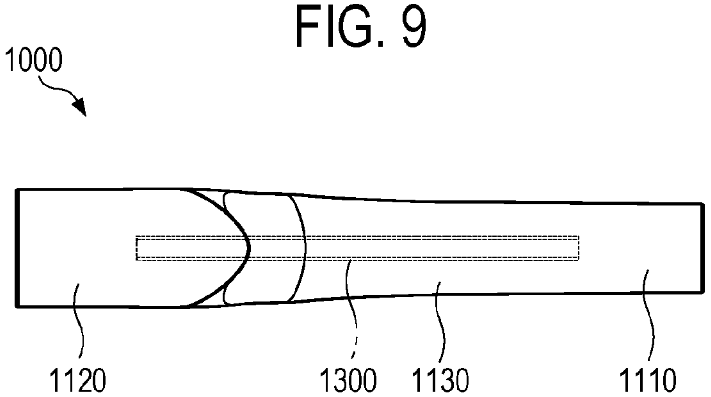
FIG. 9 is a bottom view of the fishing rod handle shown in FIG. 5.
Figure 10:
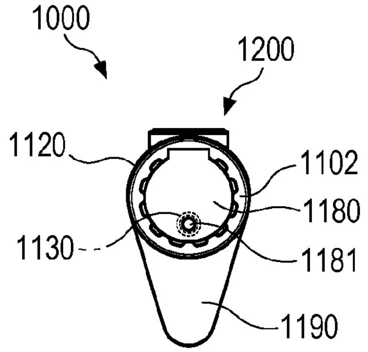
FIG. 10 is a rear view of the fishing rod handle shown in FIG. 5.
Figure 11:
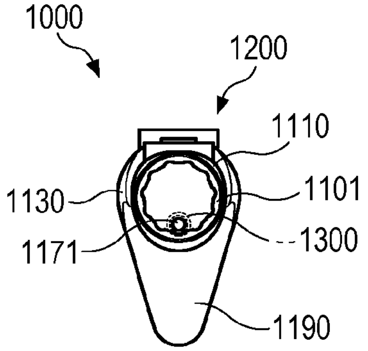
FIG. 11 is a front view of the fishing rod handle shown in FIG. 5.

FIG. 5 is a perspective view showing the fishing rod handle according to one embodiment. FIG. 6 is another perspective view showing the fishing rod handle according to one embodiment. FIGS. 7 to 11 are a side view, a top view, a bottom view, a rear view, and a front view of the fishing rod handle shown in FIG. 5, respectively. Reference is made to FIGS. 5 to 11.

In the fishing rod handle 1000 according to one embodiment, the front end portion of the fishing rod handle is configured to be coupled to the rod body (for example, the rod body 2110 shown in FIG. 3), and the rear end portion of the fishing rod handle is configured to be coupled to the rear grip (for example, the rear grip 2130 shown in FIG. 3). The front end portion and the rear end portion of the fishing rod handle are formed in a cylindrical shape. A portion of an intermediate portion of the fishing rod handle between the front end portion and the rear end portion is located lower than an upper side of the front end portion and an upper side of the rear end portion, and is offset from the upper side of the front end portion and the upper side of the rear end portion. Thus, the fishing rod handle 1000 according to one embodiment may be used as an offset handle.

The fishing rod handle 1000 according to one embodiment includes a front coupling portion 1110, a rear coupling portion 1120, and a reel fixing portion 1130. The reel fixing portion 1130 is a portion fixing the reel (e.g., the reel 2300 shown in FIG. 4), and fixes the front leg of the reel (e.g., the front leg 2310 shown in FIG. 4). The fishing rod handle 1000 according to one embodiment includes a pressing mechanism 1200, and the pressing mechanism 1200 fixes the rear leg of the reel (e.g., the rear leg 2320 shown in FIG. 4). The fishing rod handle 1000 according to one embodiment includes a reinforcing member 1300 configured to resist bending deformation of the reel fixing portion 1130.

The front coupling portion 1110, the rear coupling portion 1120, and the reel fixing portion 1130 constitute a handle body 1100 of the fishing rod handle 1000 according to one embodiment. The handle body 1100 becomes a base part of the fishing rod handle. By way of example, an angler may hold the reel fixing portion 1130 of the handle body 1100 with four fingers other than a thumb. The front coupling portion 1110, the rear coupling portion 1120, and the reel fixing portion 1130 are integrally formed to constitute the handle body 1100. The handle body 1100 is made of, for example, thermoplastic resin and may be manufactured by injection molding. The handle body 1100 made of thermoplastic resin has a light weight and does not give a cold feel to the angler.

The fishing rod handle 1000 has a trigger 1190 that obliquely protrudes downward from the intermediate portion of the handle body 1100. The trigger 1190 is inserted between the angler's fingers, and therefore the fishing rod handle can be firmly held by the angler's hand.

The pressing mechanism 1200 is configured to fix or clamp the rear leg of the reel to the handle body 1100. The pressing mechanism 1200 is disposed on a rear upper side of the reel fixing portion 1130 and is separably and movably coupled to the reel fixing portion 1130. When the reel is attached to the fishing rod handle 1000, the pressing mechanism 1200 can press and fix the rear leg of the reel to the reel fixing portion 1130.

Figure 12:
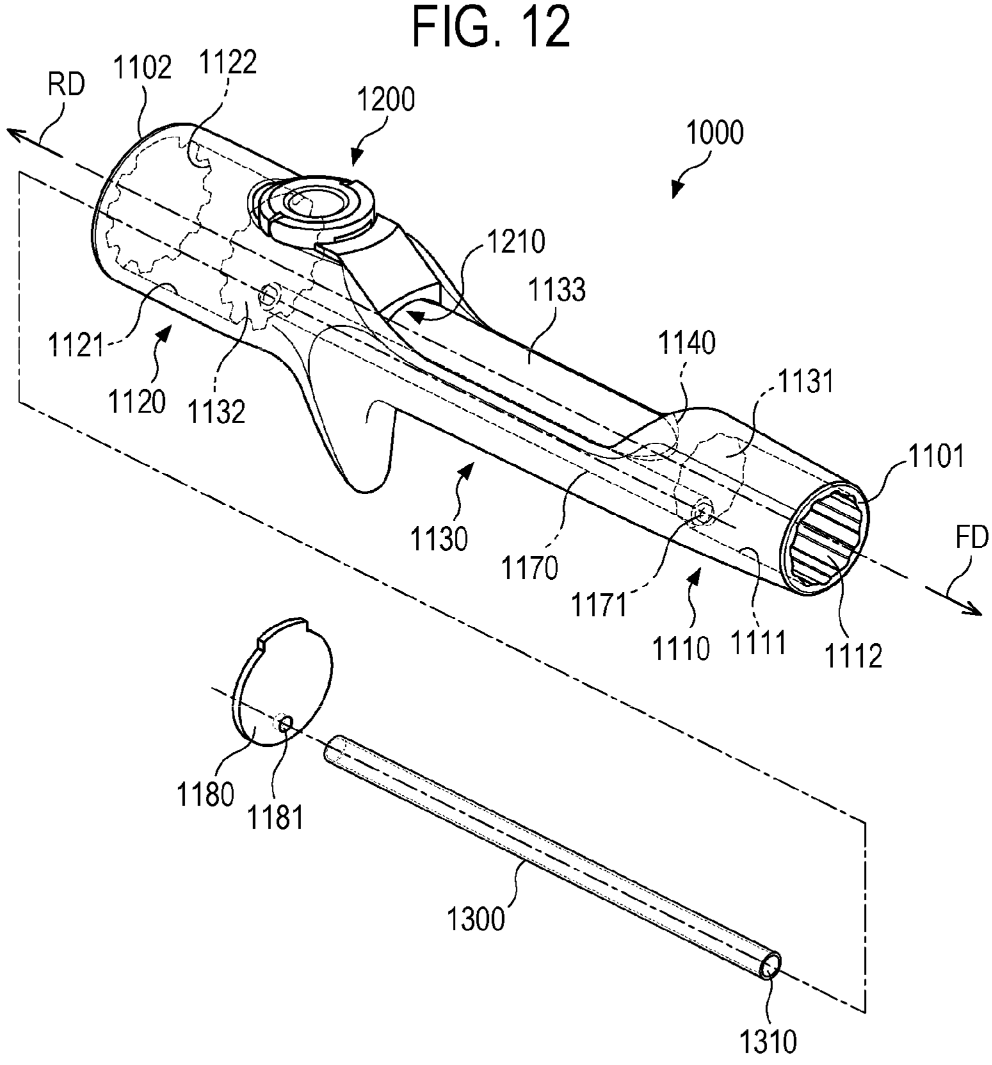
FIG. 12 is an exploded perspective view of the fishing rod handle shown in FIG. 5.
Figure 13:
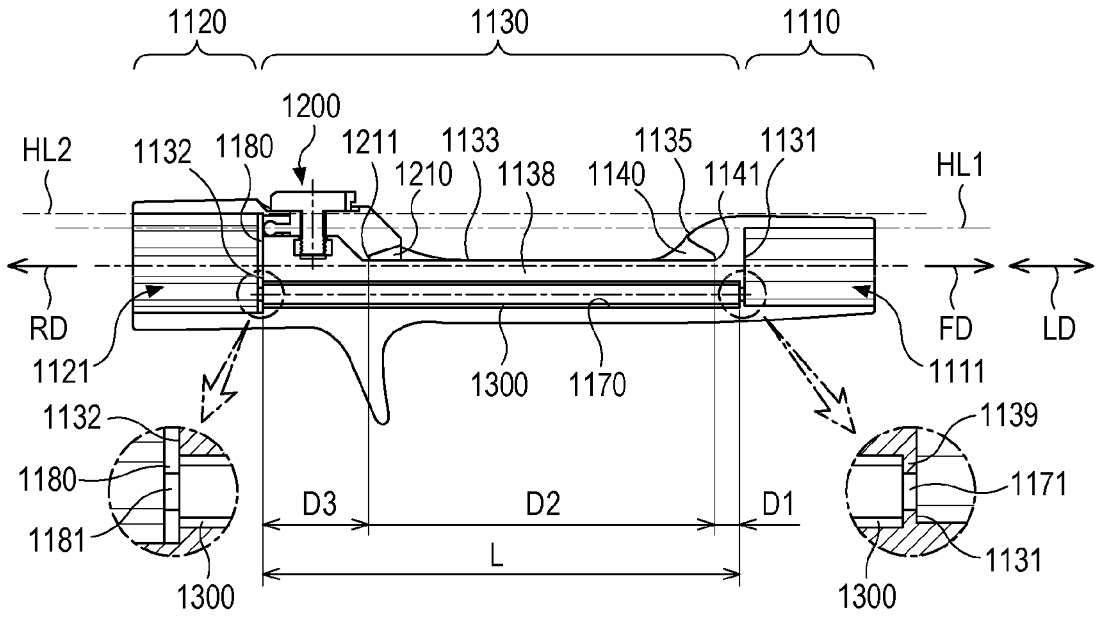
FIG. 13 is a cross-sectional view taken along line 13-13 of FIG. 5.
Figure 14:
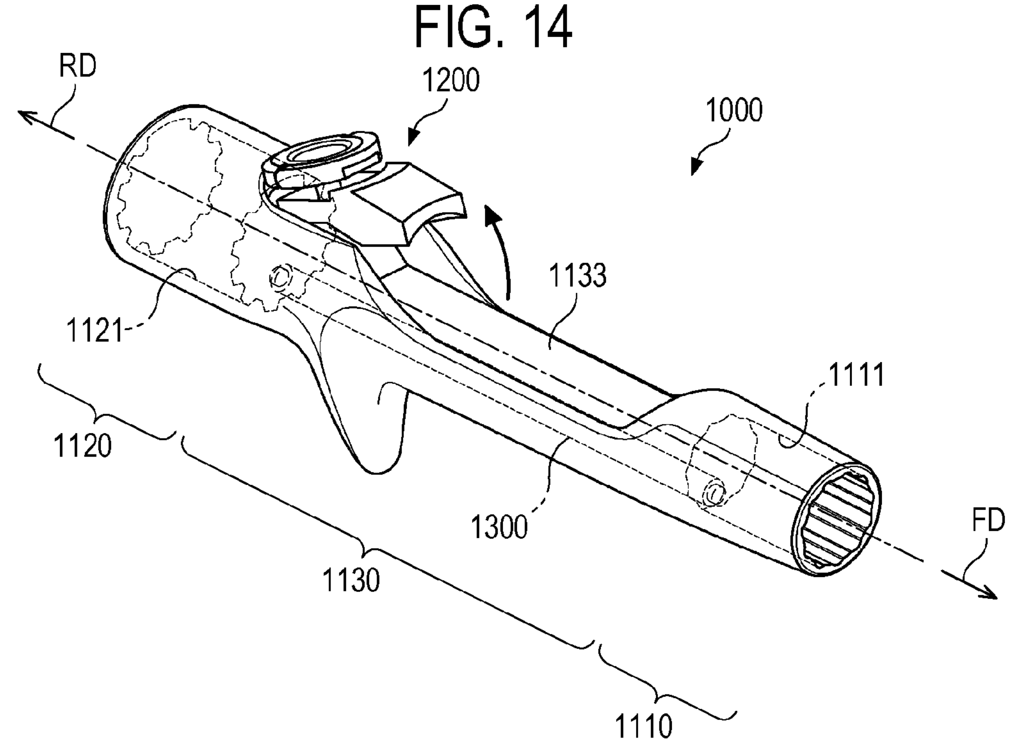
FIG. 14 is a perspective view of the fishing rod handle shown in FIG. 5 and shows rotation of a pressing mechanism.

FIG. 12 is an exploded perspective view of the fishing rod handle shown in FIG. 5. FIG. 13 is a cross-sectional view taken along line 13-13 of FIG. 5. FIG. 14 is a perspective view of the fishing rod handle according to one embodiment, showing rotation of the pressing mechanism. Reference is made to FIGS. 5, 6, and 12 to 14.

The fishing rod handle 1000 according to one embodiment is formed to seat the reel on a portion thereof, and is configured to fix and support the reel. The fishing rod handle 1000 has a front end 1101 and a rear end 1102 which are spaced apart in a longitudinal direction LD of the fishing rod handle. The longitudinal direction LD of the fishing rod handle may mean a direction parallel to the frontward direction or the rearward direction of the fishing rod.

The fishing rod handle 1000 includes the front coupling portion 1110, which functions for coupling of the rod body and the fishing rod handle and has the front end 1101. The front coupling portion 1110 is configured to be coupled to the rod body 2110 (see FIG. 3). The fishing rod handle 1000 includes the rear coupling portion 1120, which functions for coupling of the rear grip and the fishing rod handle and has the rear end 1102. The rear coupling portion 1120 is configured to be coupled to the rear grip 2130 (see FIG. 3). The rear coupling portion 1120 is spaced apart from the front coupling portion 1110 in the longitudinal direction LD. The fishing rod handle 1000 includes the reel fixing portion 1130 for fixing the reel, and the reel fixing portion 1130 is defined between the front coupling portion 1110 and the rear coupling portion 1120 along the longitudinal direction LD.

The front coupling portion 1110 includes a front coupling hole 1111 formed rearward from the front end 1101 of the fishing rod handle toward the rear end of the fishing rod handle. The front coupling hole 1111 is formed at a predetermined depth in the longitudinal direction LD. A front end of the front coupling hole 1111 is formed as an opening at the front end 1101 of the fishing rod handle. The rear end portion of the first rod body 2110 shown in FIG. 3 may be inserted into and fitted to the front coupling hole 1111. The rear end portion of the first rod body 2110 fitted to the front coupling hole 1111 may be coupled to the front coupling hole 1111 by an adhesive. The front coupling hole 1111 has a rear end spaced apart from the front end 1101 in the rearward direction by the depth of the front coupling hole, and the rear end of the front coupling hole 1111 forms a front end surface 1131 of the reel fixing portion 1130. An inner peripheral surface of the front coupling hole 1111 may have a plurality of grooves 1112 formed in the longitudinal direction LD.

The rear coupling portion 1120 includes a rear coupling hole 1121 formed frontward from the rear end 1102 of the fishing rod handle 1000 toward the front end of the fishing rod handle. The rear coupling hole 1121 is formed at a predetermined depth in the longitudinal direction LD. A rear end of the rear coupling hole 1121 is formed as an opening at the rear end 1102 of the fishing rod handle. The front end portion of the rear grip 2130 shown in FIG. 3 may be inserted into and fitted to the rear coupling hole 1121. The front end portion of the rear grip 2130 fitted to the rear coupling hole 1121 may be coupled to the rear coupling hole 1121 by an adhesive. The rear coupling hole 1121 has a front end spaced frontward from the rear end 1102 by the depth of the rear coupling hole, and the front end of the rear coupling hole 1121 forms a rear end surface 1132 of the reel fixing portion 1130. An inner peripheral surface of the rear coupling hole 1121 may have a plurality of grooves 1122 formed in the longitudinal direction LD.

The reel fixing portion 1130 may be a portion of the fishing rod handle 1000 (or the handle body 1100) which is defined between the front end surface 1131 formed as the rear end of the front coupling hole 1111 and the rear end face 1132 formed as the front end of the rear coupling hole 1121. The reel fixing portion 1130 has a first seating portion 1133 formed along the longitudinal direction LD. The first seating portion 1133 may be formed as a flat surface or a convex curved surface. When the reel is fixed to the reel fixing portion 1130, the front and rear legs of the reel are seated on the first seating portion 1133.

In the fishing rod handle 1000 according to one embodiment, the reel fixing portion 1130 has a recess 1134 which is concave downward from an upper side. When viewing the fishing rod handle from a lateral side thereof, or in the side view of the fishing rod handle (see FIG. 7), the recess 1134 is formed to be concave downward from an upper side of the front coupling portion 1110 and an upper side of the rear coupling portion 1120. A bottom surface of the recess 1134 forms the first seating portion 1133. When the fishing rod handle is viewed from the lateral side thereof (see FIG. 7), or when the fishing rod handle is viewed from a top side thereof (see FIG. 8), the recess 1134 has a continuous edge. The recess 1134 has an arc-shaped front end edge 1135, a C-shaped rear end edge 1136, and a pair of lateral end edges 1137. When the reel is attached to the fishing rod handle, the front leg of the reel passes the front end edge 1135. The rear end edge 1136 is arcuately curved so as to be lower than the upper end of the rear coupling portion 1120. The rear end edge 1136 surrounds a portion of the pressing mechanism 1200 or is located below the portion of the pressing mechanism 1200. The remaining portion of the pressing mechanism 1200 is located between the lateral end edges 1137. Accordingly, the recess 1134 accommodates the pressing mechanism 1200 in the vicinity of the rear end of the recess.

Referring to FIGS. 5, 6 and 13, the first seating portion 1133 is spaced downward from the upper side of the front coupling portion 1110 and the upper side of the rear coupling portion 1120. Specifically, the first seating portion 1133 is located below the upper side of the front coupling hole 1111 forming the front coupling portion 1110 and the upper side of the rear coupling hole 1121 forming the rear coupling portion 1120. Regarding the position of the first seating portion, a first imaginary horizontal line HL1 passing through the upper side of the front coupling hole 1111 and parallel to the longitudinal direction LD, and a second imaginary horizontal line HL2 passing through the upper side of the rear coupling hole 1121 and parallel to the longitudinal direction LD may be assumed. The first imaginary horizontal line HL1 and the second imaginary horizontal line HL2 may be spaced apart in a vertical direction or may be on the same line. Referring to FIG. 13, the first imaginary horizontal line HL1 is located below the second imaginary horizontal line HL2. The first seating portion 1133 is located below the first imaginary horizontal line HL1 and the second imaginary horizontal line HL2. Accordingly, the first seating portion 1133 is offset downward with respect to the upper end of the front coupling portion 1110 and the upper side of the rear coupling portion 1120. Due to the above-described position of the first seating portion 1133, the reel can be attached to the reel fixing portion 1130 in the state where the front and rear legs of the reel are offset downward from the upper side of the fishing rod handle, or are offset downward from the upper side of the front coupling portion 1110 and the upper side of the rear coupling portion 1120.

The reel fixing portion 1130 is configured to fix the front leg of the reel. In this regard, the reel fixing portion 1130 has a front hood 1140 that receives the front leg of the reel. When the reel is attached to the reel fixing portion, the front leg of the reel is inserted into the front hood 1140. Referring to FIG. 13, the front hood 1140 is located at the rear of the front coupling portion 1110 and is formed at a front end of the first seating portion 1133. The front hood 1140 is formed as a space between the first seating portion 1133 and the front end edge 1135 of the recess, and is formed to cover an end portion of the front leg of the reel. The front hood 1140 is opened in the rearward direction. An internal space of the front hood 1140 is formed to become gradually narrow in the frontward direction, and therefore the front hood 1140 has a closed front end 1141.

The pressing mechanism 1200 is a component independent from the handle body 1100 formed by the front coupling portion 1110, the rear coupling portion 1120, and the reel fixing portion 1130. The pressing mechanism 1200 is disposed above the first seating portion 1133. The pressing mechanism 1200 is configured to press and fix the rear leg of the reel to the first seating portion 1133.

The pressing mechanism 1200 is located in the vicinity of the rear end of the first seating portion 1133. In one embodiment, the pressing mechanism 1200 is coupled to the reel fixing portion 1130 so as to be rotatable up and down, as the pressing mechanism is moved toward or away from the first seating portion 1133. Specifically, the pressing mechanism 1200 is coupled to the reel fixing portion 1130 so as to be rotatable between an open position where the pressing mechanism allows the rear leg to be seated on the first seating portion 1133 and a closed position where the pressing mechanism presses the rear leg to fix and clamp the rear leg to the reel fixing portion 1130. Referring to FIG. 14, when the pressing mechanism 1200 is rotated upward from the first seating portion 1133 to the open position, the rear leg can be seated on the first seating portion 1133. After the rear leg is seated on the first seating portion 1133, as the pressing mechanism 1200 is rotated to the closed position and is fixed to the reel fixing portion 1130, the pressing mechanism 1200 can press the rear leg against the first seating portion 1133 to fix the rear leg.

The pressing mechanism 1200 has a rear hood 1210 formed to cover an end portion of the rear leg. The rear hood 1210 is spaced apart from the front hood 1140 in the longitudinal direction LD. The rear hood 1210 is located at a front end portion of the pressing mechanism 1200 which faces toward the front hood 1140. The rear hood 1210 is formed as a space between the pressing mechanism 1200 and the first seating portion 1133 when the pressing mechanism 1200 is positioned on the first seating portion 1133. Accordingly, the first seating portion 1133 is formed in the reel fixing portion 1130 between the front hood 1140 and the rear hood 1210.

Referring to FIGS. 13 and 14, the rear hood 1210 is opened in the frontward direction. An inner surface of the rear hood 1210 is formed to become gradually narrow in the rearward direction. Therefore, when the pressing mechanism 1200 is rotated to the first seating portion 1133 to press and fix the rear leg, the rear hood 1210 covers the rear leg from above to below, and the rear hood 1210 has a rear end 1211 closed in the rearward direction. The inner surface of the rear hood 1210 may include a plurality of inner surfaces that are formed to become narrow step by step.

The reinforcing member 1300 is disposed in the reel fixing portion 1130 of the handle body 1100. The reinforcing member 1300 reinforces a bending strength of the fishing rod handle 1000 by resisting the bending deformation of the fishing rod handle 1000 (e.g., the bending deformation of the reel fixing portion 1130). The reinforcing member 1300 may be a single continuous part that extends in the longitudinal direction LD without any cut-off portion. The reinforcing member 1300 is disposed in the reel fixing portion 1130 so as to be embedded in the reel fixing portion 1130 below the first seating portion 1133. Therefore, as shown in FIG. 13, the reel fixing portion 1130 has a spacing portion 1138 that spaces apart the first seating portion 1133 and the reinforcing member 1300 in the vertical direction.

In one embodiment, the reinforcing member 1300 may be a reinforcing pipe formed in a pipe shape. The reinforcing member 1300 formed as a reinforcing pipe has, therein, a bore 1310 perforated in a longitudinal direction of the reinforcing member. Thus, the reinforcing member 1300 has a light weight. As another example, the reinforcing member 1300 may have a shape of a cylindrical column which is solid. As a further example, the reinforcing member 1300 may have a shape of a column that has a polygonal cross-sectional shape.

The reinforcing member 1300 may be made of a material having a high bending strength and a light weight. The reinforcing member 1300 may be made of a plastic material. The reinforcing member 1300 may be made of fiber-reinforced plastic obtained by impregnating carbon fibers or glass fibers with thermosetting resin.

The reinforcing member 1300 may be coupled to the reel fixing portion 1130 in a way of being inserted into and fitted to the reel fixing portion 1130. Alternatively, the reinforcing member 1300 may be embedded in the reel fixing portion when molding the handle body of the fishing rod handle.

In one embodiment, the reinforcing member 1300 is configured to be inserted into and fitted to an insertion hole 1170 formed in the reel fixing portion 1130. The reel fixing portion 1130 has the insertion hole 1170 which is perforated through the reel fixing portion 1130 in the longitudinal direction LD from the rear coupling portion 1120 to the front coupling portion 1110 or from the front coupling portion 1110 to the rear coupling portion 1120. The insertion hole 1170 may have a cross-sectional shape corresponding to that of the reinforcing member 1300. The insertion hole 1170 is formed below the first seating portion 1133 inside the reel fixing portion 1130, and is separated from the first seating portion 1133. The insertion hole 1170 is separated downward from the first seating portion 1133 by the spacing portion 1138 of the reel fixing portion.

Front and rear ends of the insertion hole 1170 are opened. The rear end of the insertion hole 1170 is formed as an opening at the rear end surface 1132 of the reel fixing portion 1130 (the front end of the rear coupling hole 1121). The front end of the insertion hole 1170 is formed as an opening at the front end surface 1131 of the reel fixing portion 1130 (the rear end of the front coupling hole 1111). The insertion hole 1170 has a through-hole 1171 at its front end. The through-hole 1171 has a much smaller diameter than the diameter of the reinforcing member 1300. Therefore, a portion of the reel fixing portion formed along the circumference of the through-hole 1171 is formed as an isolation portion 1139, and the isolation portion 1139 can isolate the insertion hole 1170 and the front coupling portion 1110 from each other. The isolation portion 1139 can prevent a weight increase of the handle body by preventing an adhesive from entering the insertion hole 1170 when the front coupling portion 1110 and the rod body are bonded. The reinforcing member 1300 may be inserted into the insertion hole 1170 from the rear end of the insertion hole 170 toward the front end of the insertion hole. When the reinforcing member 1300 is inserted into the insertion hole 1170, the air in the insertion hole 1170 can be discharged through the through-hole 1171 surrounded by the isolation portion 1139, and the insertion of the reinforcing member 1300 can be facilitated thereby.

The reinforcing member 1300 may have a length L corresponding to a distance between the front end surface 1131 of the reel fixing portion and the rear end surface 1132 of the reel fixing portion. Alternatively, the reinforcing member 1300 may have a length L shorter than the distance between the front end surface 1131 of the reel fixing portion and the rear end surface 1132 of the reel fixing portion. Alternatively, the reinforcing member 1300 may have a length L longer than a distance between the front end 1141 of the front hood 1140 and the rear end 1211 of the rear hood 1210.

Referring to FIG. 13, the length L of the reinforcing member 1300 may be the sum of a first distance D1, a second distance D2, and a third distance D3. The first distance D1 may be a distance between the front end 1141 of the front hood 1140 and the front end surface 1131 of the reel fixing portion 1130. In the example where the insertion hole 1170 has the through-hole 1171, the first distance D1 may be a distance between the front end 1141 of the front hood and a rear end of the isolation portion 1139. The second distance D2 may be a distance between the front end 1141 of the front hood 1140 and the rear end 1211 of the rear hood 1210. The third distance D3 may be a distance between the rear end 1211 of the rear hood 1210 and the rear end surface 1132 of the reel fixing portion 1130. Alternatively, the length L of the reinforcing member 1300 may be larger than the second distance D2. Alternatively, the length L of the reinforcing member 1300 may be larger than the second distance D2 and may be smaller than the sum of the first distance D1, the second distance D2 and the third distance D3. In this case, the front end of the reinforcing member 1300 may be within the range of the first distance D1, and the rear end of the reinforcing member 1300 may be within the range of the third distance D3.

The pressing mechanism 1200 is located on the rear upper side of the reel fixing portion 1130 and may be configured as a compact device. The pressing mechanism 1200 does not exist inside the reel fixing portion 1130 below the first seating portion 1133. Thus, the lightweight reinforcing member 1300 may be coupled to the reel fixing portion 1130 in such a form that the reinforcing member 1300 is embedded in the reel fixing portion 1130 throughout the whole of the reel fixing portion 1130 without interfering with the pressing mechanism 1200. Accordingly, the fishing rod handle 1000 can have a light weight and a slim shape, and can secure sufficient strength for preventing deformation or breakage by shear in the reel fixing portion 1130. Since the pressing mechanism 1200 is located at the rear of the reel fixing portion 1130, the fishing line released frontward from the reel does not get caught on the pressing mechanism 1200. Since the pressing mechanism 1200 is located on the upper side of the reel fixing portion 1130, the pressing mechanism 1200 does not make contact with the angler's index and middle fingers, and the angler does not feel an uncomfortable sense caused by the part for fixing the legs of the reel.

In one embodiment, the fishing rod handle 1000 may include a cover 1180 covering the reinforcing member 1300 embedded in the reel fixing portion 1130. The cover 1180 may have a shape corresponding to the shape of the rear coupling hole 1121 and may have an opening 1181 communicating with the bore 1310 of the reinforcing member 1300. The cover 1180 is inserted into and fitted to the rear coupling hole 1121 and can cover the rear end surface 1132 of the reel fixing portion.

Figure 15:
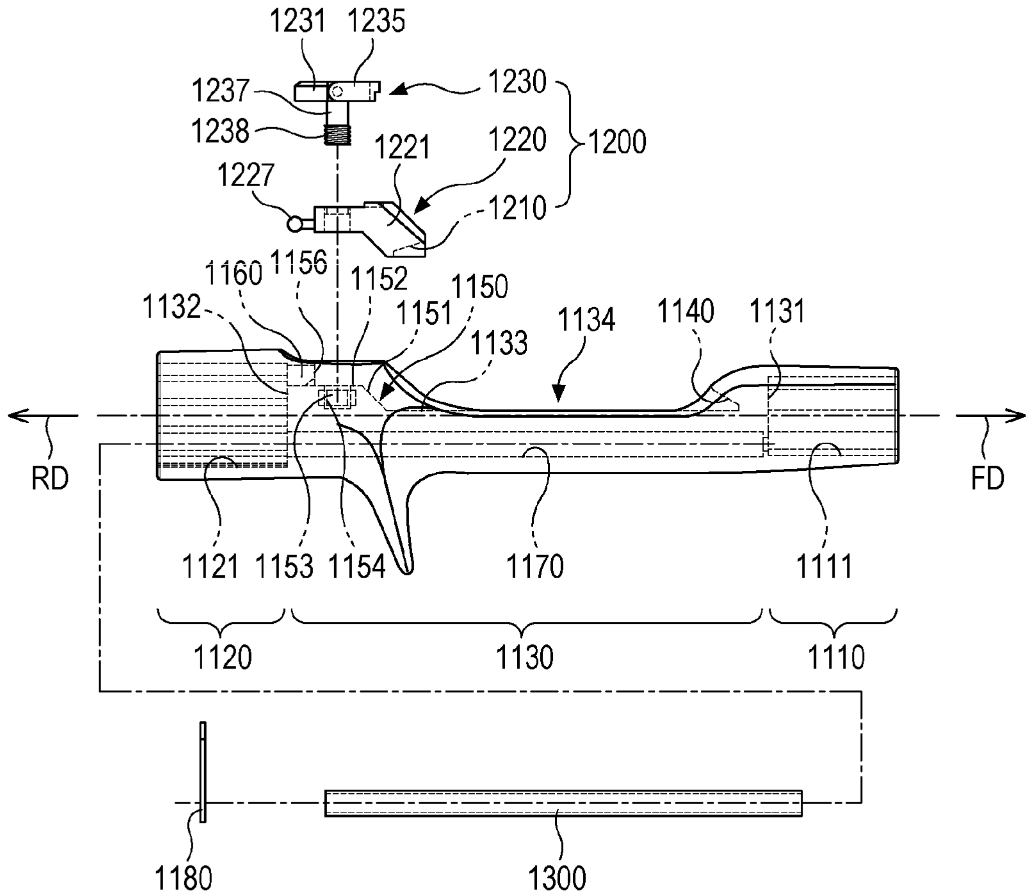
FIG. 15 is an exploded side view showing the fishing rod handle according to one embodiment.
Figure 16:
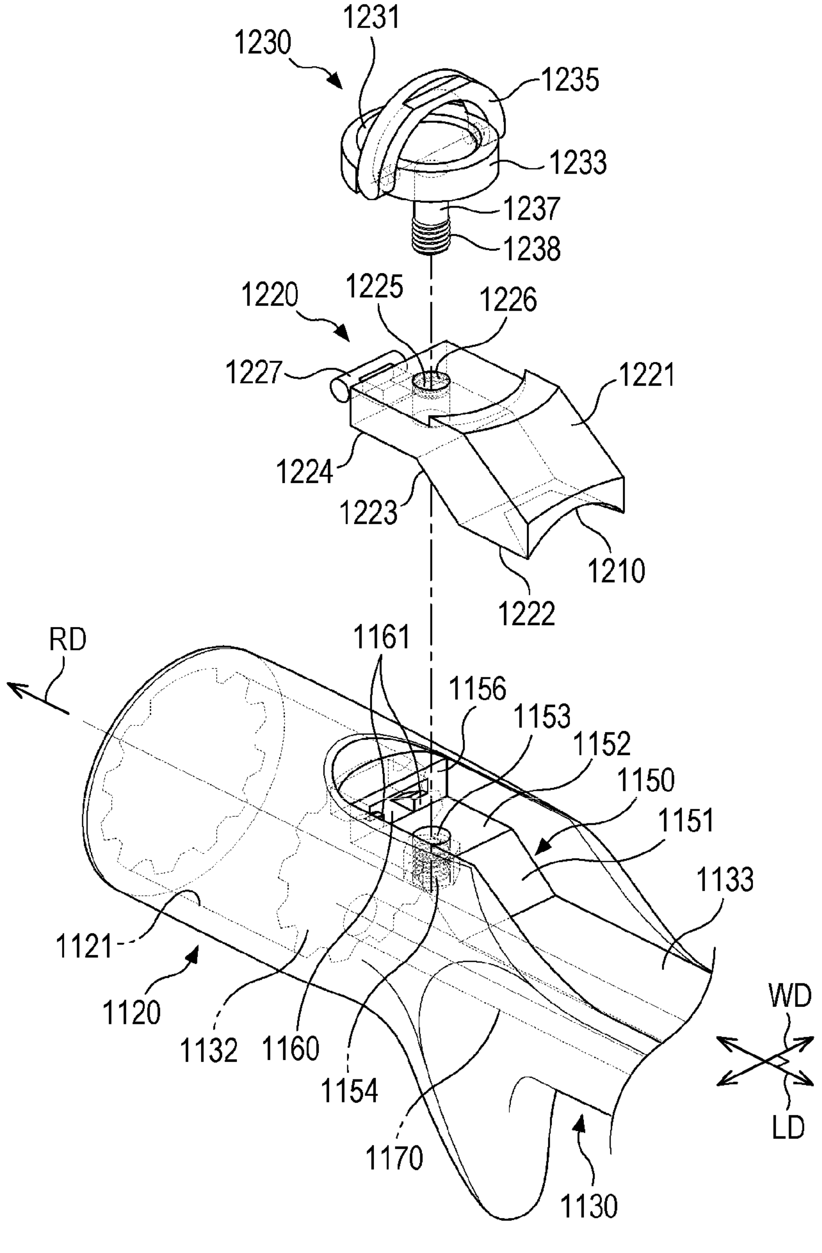
FIG. 16 is an exploded perspective view showing a handle body and a pressing mechanism of the fishing rod handle according to one embodiment.
Figure 17:
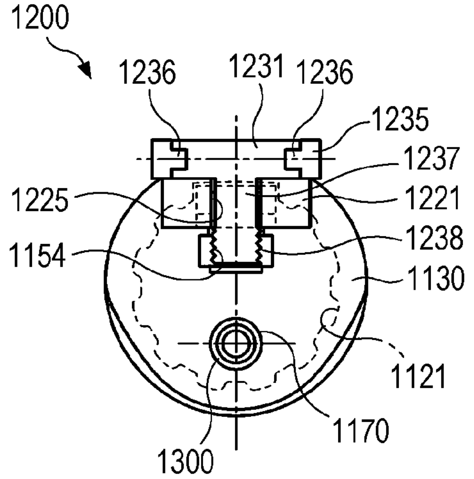
FIG. 17 is a cross-sectional view taken along line 17-17 of FIG. 5.
Figure 18:
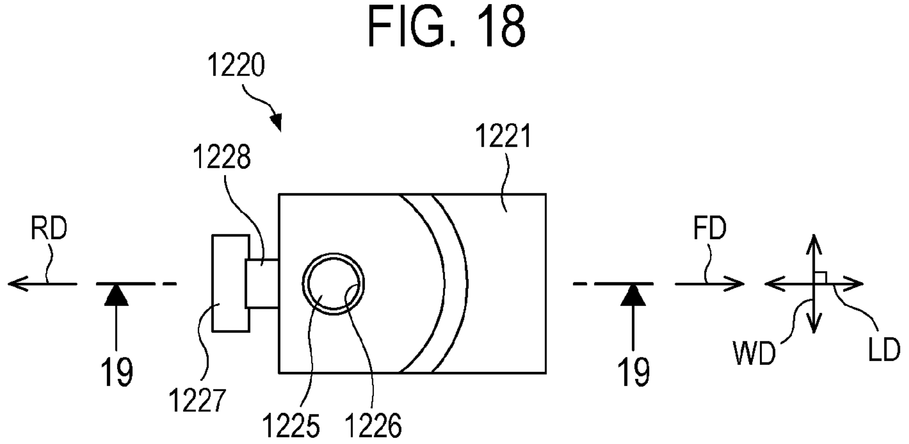
FIG. 18 is a top view showing a pressing member in the fishing rod handle according to one embodiment.
Figure 19:
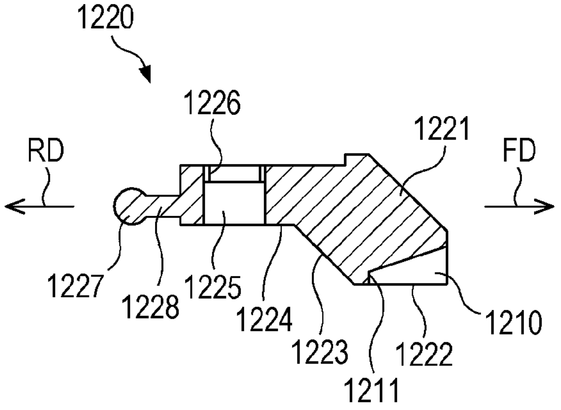
FIG. 19 is a cross-sectional view taken along line 19-19 of FIG. 18.
Figure 20:
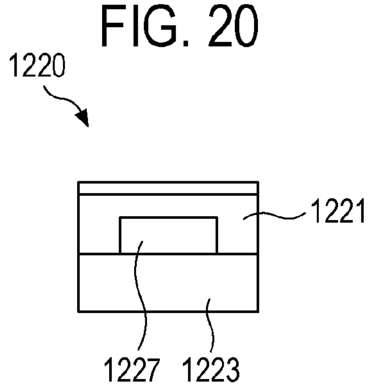
FIG. 20 is a rear view of the pressing member shown in FIG. 18.
Figure 21:
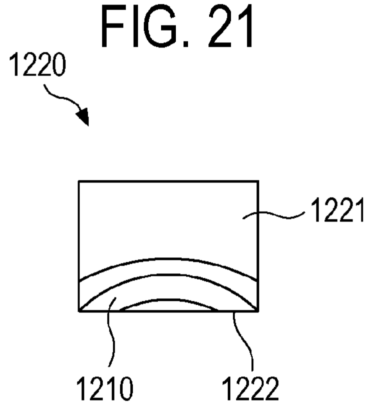
FIG. 21 is a front view of the pressing member shown in FIG. 18.
Figure 22:
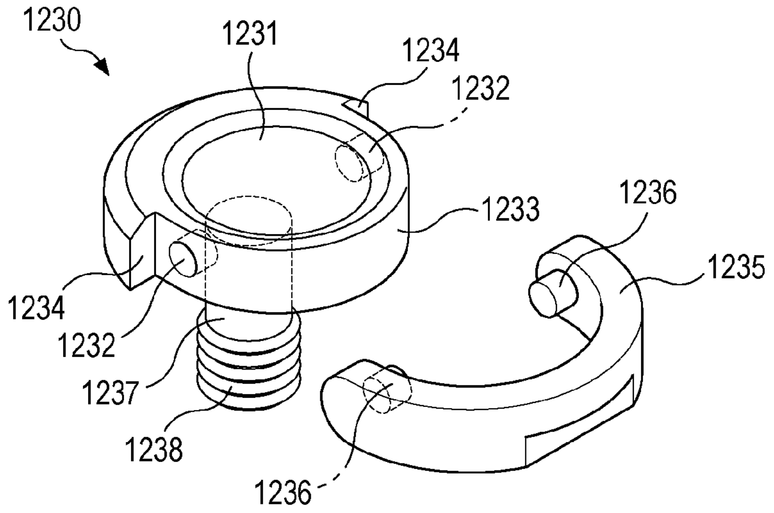
FIG. 22 is an exploded perspective view showing a pressing screw in the fishing rod handle according to one embodiment.
Figure 23:
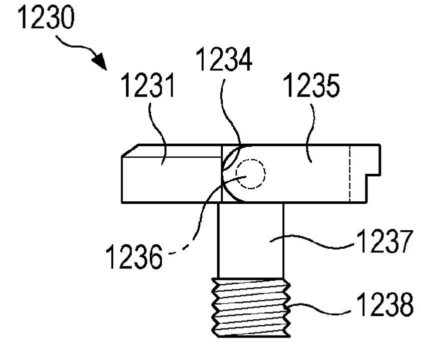
FIG. 23 is a side view showing the pressing screw in the fishing rod handle according to one embodiment.
Figure 24:
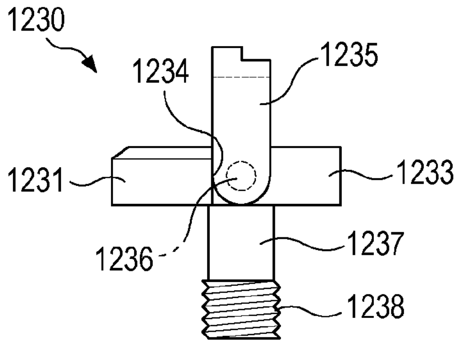
FIG. 24 is another side view showing the pressing screw in the fishing rod handle according to one embodiment.
Figure 25:
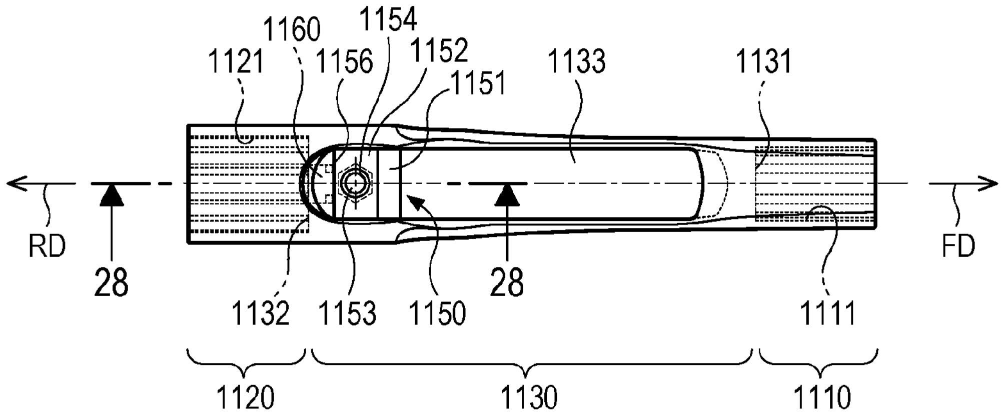
FIG. 25 is a top view showing a handle body of the fishing rod handle according to one embodiment.
Figure 26:
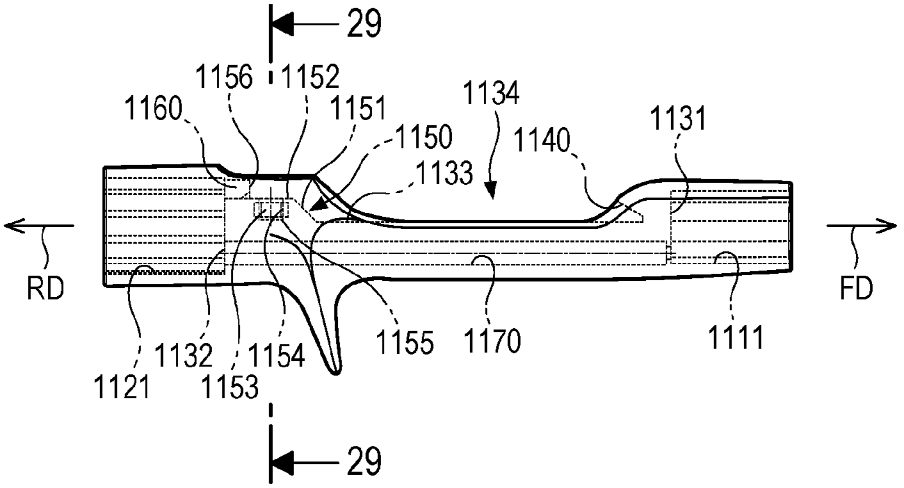
FIG. 26 is a side view of the handle body shown in FIG. 25.
Figure 27:
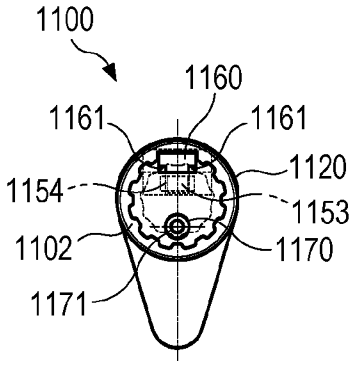
FIG. 27 is a rear view of the handle body shown in FIG. 25.
Figure 28:
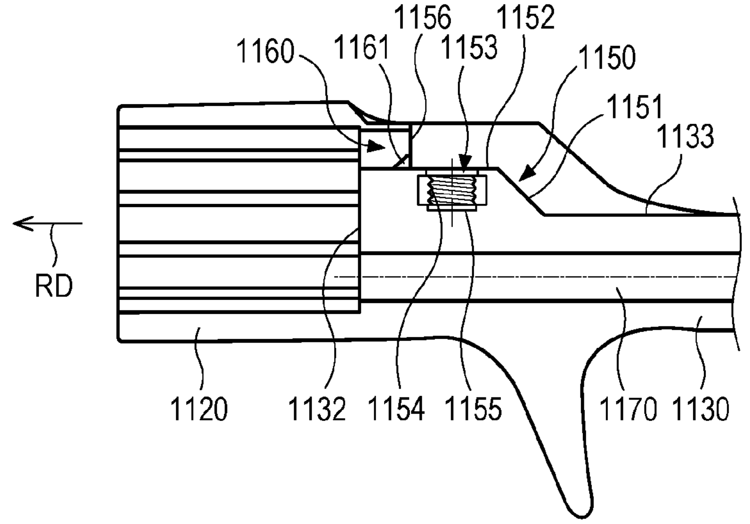
FIG. 28 is a cross-sectional view taken along line 28-28 of FIG. 25.
Figure 29:
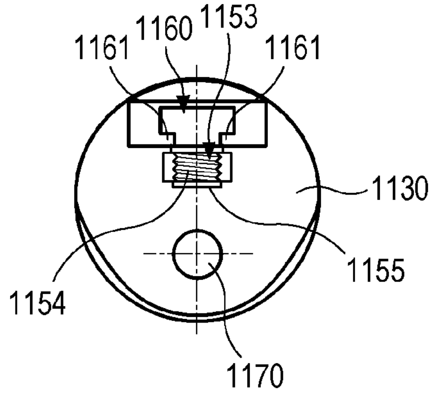
FIG. 29 is a cross-sectional view taken along line 29-29 of FIG. 26.

FIG. 15 is an exploded side view showing the fishing rod handle according to one embodiment. FIG. 16 is an exploded perspective view showing the handle body and the pressing mechanism of the fishing rod handle according to one embodiment. FIG. 17 is a cross-sectional view taken along line 17-17 of FIG. 5. FIGS. 18 to 21 are a top view, a cross-sectional view, a rear view, and a front view showing the pressing member of the pressing mechanism, respectively. FIG. 22 is an exploded perspective view showing a pressing screw of the pressing mechanism, and FIGS. 23 and 24 are side views showing the pressing screw of the pressing mechanism. FIGS. 25 to 27 are a top view, a side view, and a rear view showing the handle body of the fishing rod handle according to one embodiment, respectively. FIG. 28 is a cross-sectional view taken along line 28-28 of FIG. 25, and FIG. 29 is a cross-sectional view taken along line 29-29 of FIG. 26. With reference to FIGS. 15 to 29, the pressing mechanism and the coupling between the pressing mechanism and the reel fixing portion are described.

Reference is made to FIGS. 15 to 17. The pressing mechanism 1200 is located above the reinforcing member 1300 and does not make contact with the reinforcing member 1300. According to one embodiment, the pressing mechanism 1200 includes a pressing member 1220 and a pressing screw 1230.

The pressing member 1220 is rotatably coupled to the reel fixing portion 1130 and is disposed above the first seating portion 1133. The rear hood 1210 for receiving the rear leg of the reel is formed in the pressing member 1220. Thus, the pressing member 1220 is configured to press the rear leg against the first seating portion 1133. The pressing screw 1230 passes through the pressing member 1220 from top to bottom and is separably fastened to the reel fixing portion 1130. When the pressing screw 1230 is fastened to the reel fixing portion 1130, the pressing screw 1230 fixes and clamps the pressing member 1220 to the reel fixing portion

1130 so that the rear hood 1210 can press and fix the rear leg to the first seating portion 1133. As such, the pressing mechanism 1200 includes the pressing member 1220 which is rotatable above the first seating portion 1133 so as to press the rear leg, and the pressing screw 1230 which is coupled to the reel fixing portion 1130 from top to bottom so as to fix and clamp the pressing member 1220, whereby the pressing mechanism can be configured as a compact device.

Reference is made to FIGS. 16 and 18 to 21. The pressing member 1220 includes a pressing portion 1221 which presses the rear leg of the reel, and a rotary shaft portion 1227 which functions as a rotary shaft of the pressing member. The rear hood 1210 is formed in a lower surface of the pressing portion 1221. Thus, the pressing portion 1221 is configured to press the rear leg at the lower surface thereof. In the pressing member 1220, the rotary shaft portion 1227 is disposed at the opposite side of the rear hood 1210. The rotary shaft portion 1227 is disposed in a width direction WD orthogonal to the longitudinal direction LD.

When viewing the pressing member 1220 from a lateral side thereof, or in the side view of the pressing member 1220 (see FIG. 19), the pressing portion 1221 is formed to be bent in an oblique direction between the frontward direction and the downward direction. Therefore, when viewing the pressing member from the lateral side, the pressing portion 1221 has an L-shape, a V-shape, or a shape bent at a predetermined angle. Due to the above-described shape of the pressing portion 1221, the lower surface of the pressing portion 1221 has an L-shape, a V-shape, or a shape bent at a predetermined angle. The open end of the rear hood 1210 is located at a front end surface of the pressing portion 1221, and the rear end 1211 of the rear hood 1210 is located at the lower surface of the pressing portion 1221.

In one embodiment, the lower surface of the pressing portion 1221 includes a first lower surface 1222 capable of making contact with the first seating portion 1133, a second lower surface 1223 extending in the rearward direction from the first lower surface 1222 and bent upward with respect to the first lower surface 1222, and a third lower surface 1224 extending in the rearward direction from the second lower surface 1223 and bent downward with respect to the second lower surface 1223. The second lower surface 1223 extends obliquely upward from the first lower surface 1222. The third lower surface 1224 extends parallel to the first lower surface 1222 from the second lower surface 1223. The rear hood 1210 is located in the first lower surface 1222. The second lower surface 1223 and the third lower surface 1224 do not make contact with the first seating portion 1133, but can make contact with a portion of the reel fixing portion 1130 at the rear of the first seating portion 1133. The rear hood 1210 is formed over a front end and a lower end of the pressing portion 1221.

A passage hole 1225 through which the pressing screw 1230 passes is formed in the pressing portion 1221. The passage hole 1225 is spaced apart rearward from the rear hood 1210. The passage hole 1225 is vertically perforated through the pressing portion 1221. The pressing screw 1230 passes through the passage hole 1225 and is fastened to the reel fixing portion 1130. An upper end of the passage hole 1225 is located in an upper surface of the pressing portion 1221, and a lower end of the passage hole 1225 is located in the third lower surface 1224. The passage hole 1225 has a female thread 1226 in the vicinity of an upper end of an inner peripheral surface of the passage hole.

The rotary shaft portion 1227 is connected to the pressing portion 1221. The pressing member 1220 has a protrusion portion 1228 protruding from the pressing portion 1221 in the rearward direction. The protrusion portion 1228 is located rearward of the passage hole 1225. The rotary shaft portion 1227 is formed at a rear end of the protrusion portion 1228. The rotary shaft portion 1227 functions as a rotation center of the pressing mechanism 1200 and the pressing member 1220. In the state where the pressing mechanism 1200 is coupled to the reel fixing portion 1130, the pressing member 1220 can be rotated up and down about the rotary shaft portion 1227. Specifically, the pressing member 1220 is coupled to the reel fixing portion 1130 so as to be rotatable about the rotary shaft portion 1227 to the open position where the pressing portion 1221 is spaced upward from the first seating portion 1133 to allow the rear leg to be seated on the first seating portion 1133 and to the closed position where the pressing portion 1221 presses the rear leg against the first seating portion 1133.

Reference is made to FIGS. 16, 17 and 22 to 24. The pressing screw 1230 passes through the passage hole 1225 of the pressing member, and is separably fastened to the reel fixing portion 1130. The pressing screw 1230 includes a circular disk-shaped head portion 1231, and a shank portion 1237 extending downward from the head portion 1231. The head portion 1231 is formed so as to press the upper surface of the pressing portion 1221 at a lower surface of the head portion. The shank portion 1237 has a male thread 1238 on its outer peripheral surface. The shank portion 1237 is coupled to the reel fixing portion 1130 through thread engagement action.

In one embodiment, the pressing screw 1230 has a head handle 1235 rotatably coupled to the head portion 1231. The head handle 1235 can be manipulated for the rotation of the pressing screw 1230. By way of example, the head handle 1235 is formed as a semicircular ring. The head handle 1235 has rotation pins 1236 protruding inward at both ends of the head handle. Pin holes 1232 corresponding to the respective rotation pins 1236 are formed in the head portion 1231. The rotation pins 1236 are fitted to the head portion 1231, and the head handle 1235 is rotatably coupled to the head portion 1231 thereby. The head handle 1235 can be rotated to a position where the head handle is parallel to the head portion 1231 (see FIG. 23) and to a position where the head handle is erected at a right angle with respect to the head portion 1231 (see FIG. 24). An angler may fasten the pressing screw 1230 to the reel fixing portion 1130 or may separate the pressing screw 1230 from the reel fixing portion 1130 by erecting the head handle 1235 with respect to the head portion 1231 and turning the head handle 1235 clockwise or counterclockwise. Therefore, the angler can rotate the pressing screw 1230 with his or her fingers without the use of a tool.

The head portion 1231 has a recessed edge 1233 which is formed along a circumferential direction of the head portion and is recessed inward of the head portion. The pin holes 1232 are formed adjacent to the respective ends of the recessed edge 1233. The respective ends of the recessed edge 1233 form protruding ends 1234, and the protruding ends 1234 protrude with respect to a center of the head portion 1231. The recessed edge 1233 is recessed by a thickness of the head handle 1235, and an inner peripheral surface of the head handle 1235 can make contact with the recessed edge 1233. Thus, when the head handle 1235 is positioned in parallel with the head portion 1231, the head handle 1235 is received in the recessed edge 1233. That is, when the head handle 1235 is positioned in parallel with the head portion 1231, an outer peripheral surface of the head portion 1231 and an outer peripheral surface of the head handle 1235 can form a substantially circular shape, and the head handle 1235 does not protrude from the head portion 1231.

The head handle 1235 may be fitted to the head portion 1231 such that the respective ends of the head handle 1235 make frictional contact with the protruding ends 1234. Alternatively, the rotation pins 1236 of the head handle may be fitted to the pin holes 1232 of the head portion so as to make frictional contact with the pin holes. Therefore, the head handle 1235 can be fixed to the head portion 1231 at a predetermined position.

Reference is made to FIGS. 16 and 25 to 29. The reel fixing portion 1130 includes a second seating portion 1150 on which the pressing mechanism 1200 is seated and fixed. The second seating portion 1150 is spaced apart and separated upward from the insertion hole 1170 into which the reinforcing member 1300 is inserted.

When the pressing mechanism 1200 is rotated toward the first seating portion 1133 and is positioned to the closed position, the pressing member 1220 is seated on the second seating portion 1150. The second seating portion 1150 extends from the first seating portion 1133. The second seating portion 1150 has a shape protruding upward from the first seating portion 1133 so as to have a shape complementary to the shape of the lower surface of the pressing portion. Accordingly, an upper surface of the second seating portion 1150 has an L-shape, a V-shape, or a shape bent at a predetermined angle, which corresponds to the shape of the lower surface of the pressing portion. The pressing member 1220 is seated on the second seating portion 1150 through the surface-to-surface contact between the lower surface of the pressing member and the upper surface of the second seating portion, which are formed in complementary shapes. Accordingly, the fishing rod handle, in which the first seating portion 1133 is offset downward from the front coupling hole 1111 and the rear coupling hole 1121, can have a reduced vertical dimension. Further, the fishing rod handle may be configured such that the pressing screw 1230 hardly protrudes with respect to the upper end of the rear coupling portion 1120.

The second seating portion 1150 has a first contact surface 1151 and a second contact surface 1152, which make contact with the lower surface of the pressing portion in a complementary manner. The first contact surface 1151 and the second contact surface 1152 form an upper surface of the second seating portion. Further, the first contact surface 1151 and the second contact surface 1152 form a portion of a bottom surface of the recess 1134.

The first contact surface 1151 protrudes upward from the first seating portion 1133. The first contact surface 1151 protrudes upward from the first seating portion 1133 and obliquely extends from the first seating portion 1133 in the rearward direction. The second contact surface 1152 extends from the first contact surface 1151 in the rearward direction. The second contact surface 1152 is located above the first seating portion 1133 and may be parallel to the first seating portion 1133. The first contact surface 1151 can make contact complementarily with the second lower surface 1223 of the pressing portion (see FIG. 19). The second contact surface 1152 can make contact complementarily with the third lower surface 1224 of the pressing portion (see FIG. 19).

The second seating portion 1150 has a fastening hole 1153 to which the shank portion 1237 of the pressing screw is coupled through thread engagement action. The fastening hole 1153 has, on its inner peripheral surface, a female thread 1154 which is coupled to the male thread 1238 of the shank portion through thread engagement action. The female thread 1154 may be formed as a female thread of a nut embedded in the second seating portion 1150. The fastening hole 1153 is formed downward from the upper surface of the second seating portion 1150, and an upper end of the fastening hole 1153 is located in the second contact surface 1152. In the reel fixing portion 1130, the fastening hole 1153 is located above the reinforcing member 1300 and is spaced apart and separated from the insertion hole 1170. Therefore, the fastening hole 1153 has a closed lower end 1155 spaced upward from the reinforcing member 1300.

The reel fixing portion 1130 includes a slit portion 1160 to which the rotary shaft portion 1227 of the pressing member is movably and rotatably fitted. The slit portion 1160 is located above the second seating portion 1150. The slit portion 1160 is adjacent to the second contact surface 1152 of the second seating portion 1150.

As shown in FIGS. 16, 25 and 26, the second seating portion 1150 has a perpendicular wall surface 1156 perpendicular to the second contact surface 1152, and the slit portion 1160 is perforated through the reel fixing portion 1130 in the rearward direction from the perpendicular wall surface 1156. The slit portion 1160 may be formed to accommodate the rotary shaft portion 1227 and the protrusion portion 1228 of the pressing member. The slit portion 1160 is formed to have a length larger than a thickness of the rotary shaft portion 1227 in the longitudinal direction. Therefore, the rotary shaft portion 1227 of the pressing member can be fitted to the slit portion 1160 so as to be movable in the frontward direction and the rearward direction. The slit portion 1160 may be adjacent to the rear coupling hole 1121 in the state of being isolated from the rear coupling hole 1121. For example, the slit portion 1160 may be formed to be perforated through the perpendicular wall surface 1156 of the second seating portion 1150 and the rear end surface 1132 of the reel fixing portion 1130 in the frontward and rearward directions, and may be isolated from the rear coupling hole 1121 by the cover 1180 (see FIG. 15). Alternatively, the slit portion 1160 may be formed at a predetermined depth from the perpendicular wall surface 1156 of the second seating portion 1150.

The slit portion 1160 has a pair of inclined protrusions 1161. The inclined protrusions 1161 are located at a front entrance of the slit portion 1160, and descend gradually in the rearward direction. The inclined protrusions 1161 are inclined upward with respect to a lower surface of the slit portion 1160. The protrusion portion 1228 of the pressing member can be positioned between the pair of inclined protrusions 1161, and the rotary shaft portion 1227 of the pressing member can be guided up and down by the pair of inclined protrusions 1161.

FIGS. 30 to 34 sequentially show examples of processes where the pressing mechanism is coupled to the reel fixing portion. With reference to FIGS. 16 and 30 to 34, the processes of coupling the pressing mechanism to the reel fixing portion are described.

Figure 30:
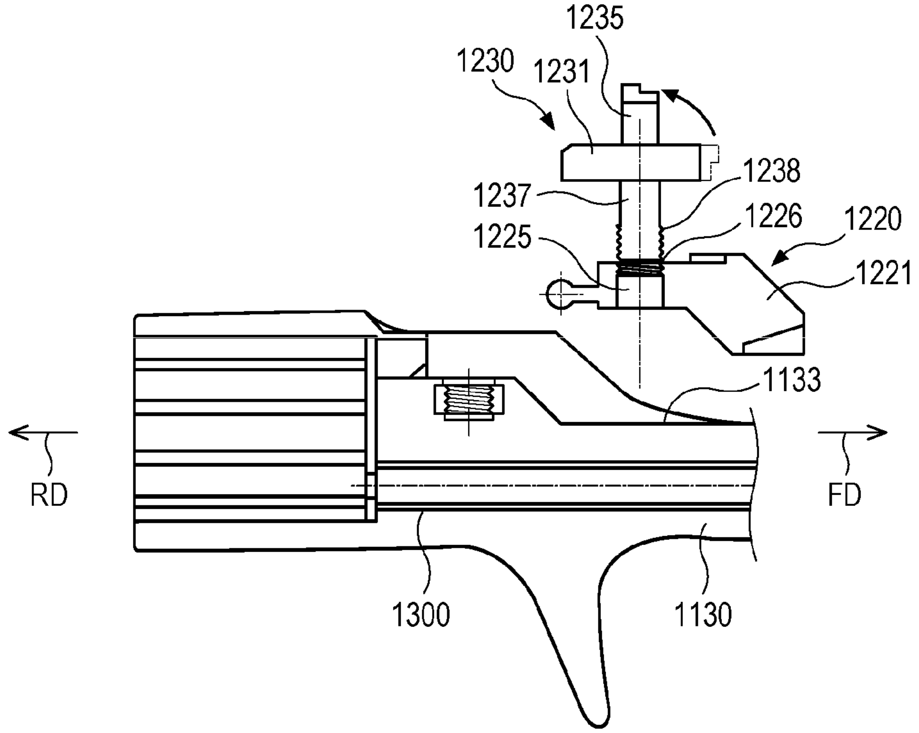
FIG. 30 is a cross-sectional view showing a first example of processes where the pressing mechanism is coupled to the reel fixing portion according to one embodiment.
Figure 31:
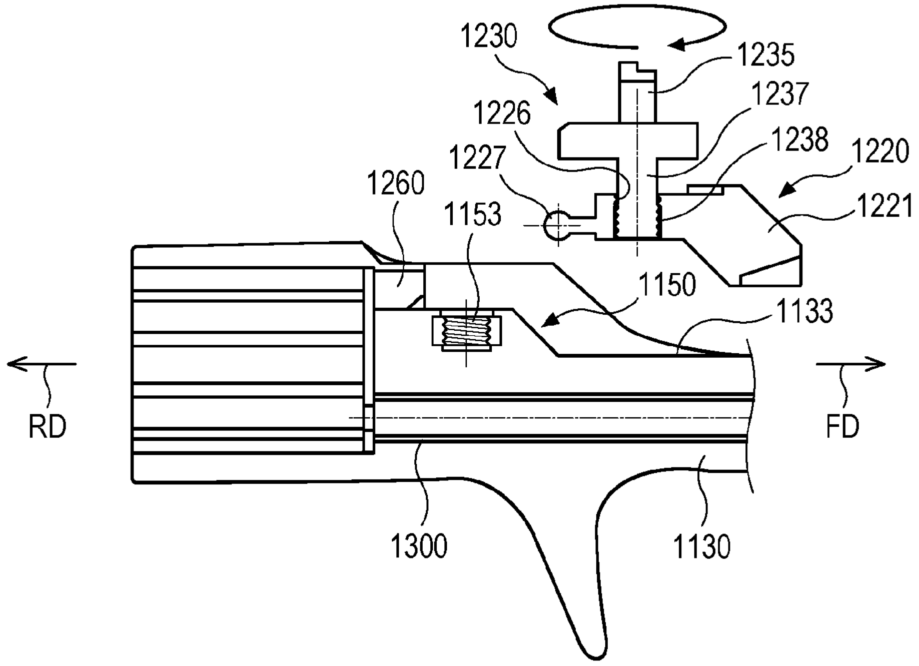
FIG. 31 is a cross-sectional view showing a second example of the processes where the pressing mechanism is coupled to the reel fixing portion according to one embodiment.

Referring to FIG. 30, the head handle 1235 of the pressing screw 1230 is erected with respect to the head portion 1231, and the shank portion 1237 of the pressing screw is aligned with the passage hole 1225 of the pressing member 1220. Referring to FIG. 31, by the rotation of the head handle 1235, the shank portion 1237 is temporarily fixed to the passage hole of the pressing portion 1221 through thread engagement action between the male thread 1238 and the female thread 1226 of the passage hole.

Figure 32:
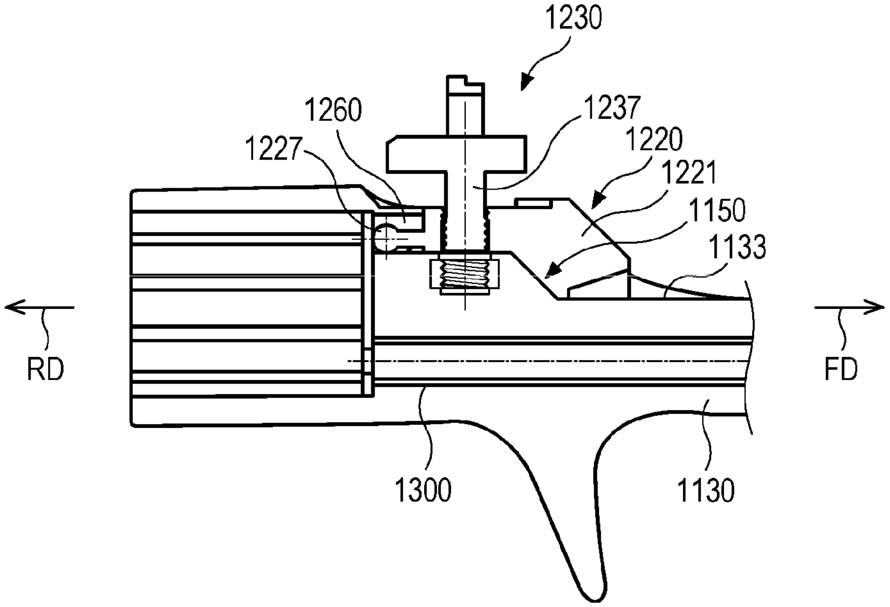
FIG. 32 is a cross-sectional view showing a third example of the processes where the pressing mechanism is coupled to the reel fixing portion according to one embodiment.

Referring to FIG. 32, the pressing member 1220 is moved to the second seating portion 1150, and the rotary shaft portion 1227 of the pressing member is inserted into the slit portion 1160. When the rotary shaft portion 1227 is fitted to the slit portion 1160, the pressing portion 1221 can be seated on the first seating portion 1133 and the second seating portion 1150.

Figure 33:
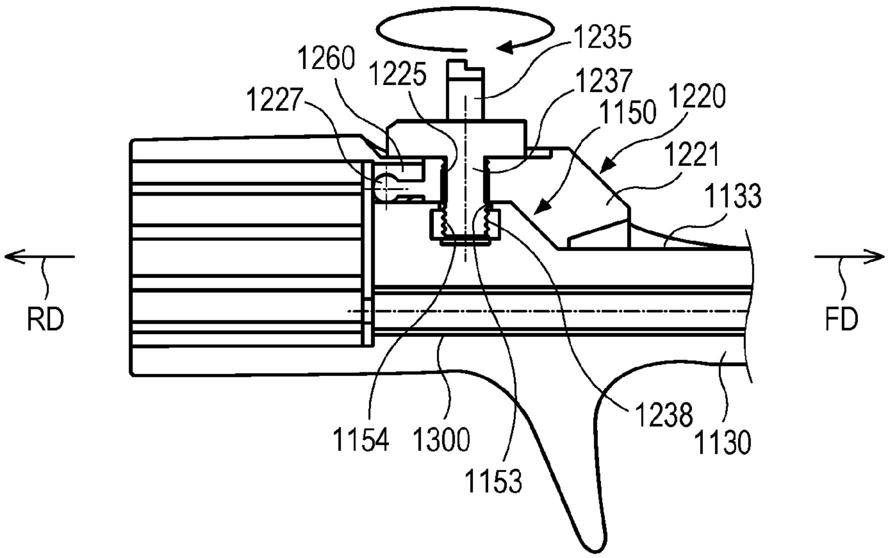
FIG. 33 is a cross-sectional view showing a fourth example of the processes where the pressing mechanism is coupled to the reel fixing portion according to one embodiment.
Figure 34:
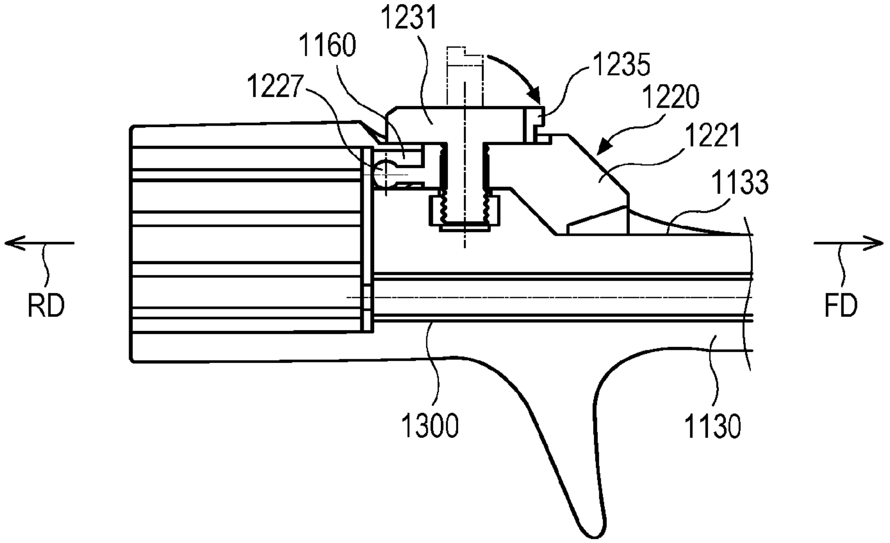
FIG. 34 is a cross-sectional view showing a fifth example of the processes where the pressing mechanism is coupled to the reel fixing portion according to one embodiment.

Referring to FIG. 33, in the state where the pressing portion 1221 is seated on the first seating portion 1133 and the second seating portion 1150 and the rotary shaft portion 1227 is fitted to the slit portion 1160, by the rotation of the head handle 1235, the shank portion 1237 of the pressing screw is coupled from the passage hole of the pressing portion 1221 to the fastening hole 1153 of the second seating portion 1150 through thread engagement action. By way of example, as the head handle 1235 is rotated clockwise, the male thread 1238 of the shank portion 1237 is coupled to the female thread 1154 of the fastening hole through thread engagement action. As the pressing screw 1230 is fastened to the fastening hole 1153, the lower surface of the head portion 1231 of the pressing screw presses the upper surface of the pressing portion 1221 downward. That is, as the shank portion 1237 is coupled to the fastening hole 1153 through thread engagement action by the rotation of the pressing screw 1230, the head portion 1231 presses the pressing portion 1221, thereby fixing and clamping the pressing member 1220 to the reel fixing portion 1130. Referring to FIG. 34, after the pressing member 1220 is fixed to the reel fixing portion 1130, the head handle 1235 can be positioned on the upper surface of the pressing portion 1221 in parallel with the head portion 1231.

Figure 35:
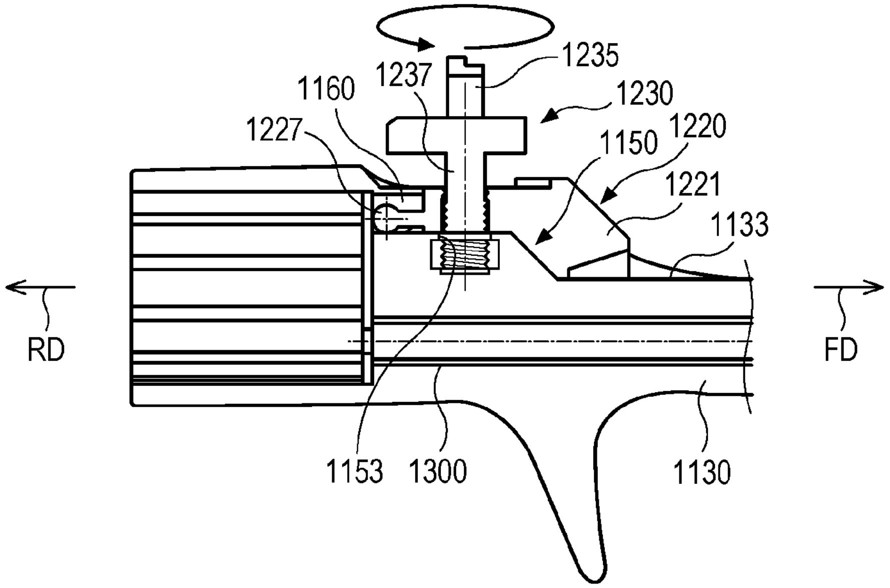
FIG. 35 is a cross-sectional view showing a first example of processes where the pressing mechanism is separated from the reel fixing portion according to one embodiment.
Figure 36:
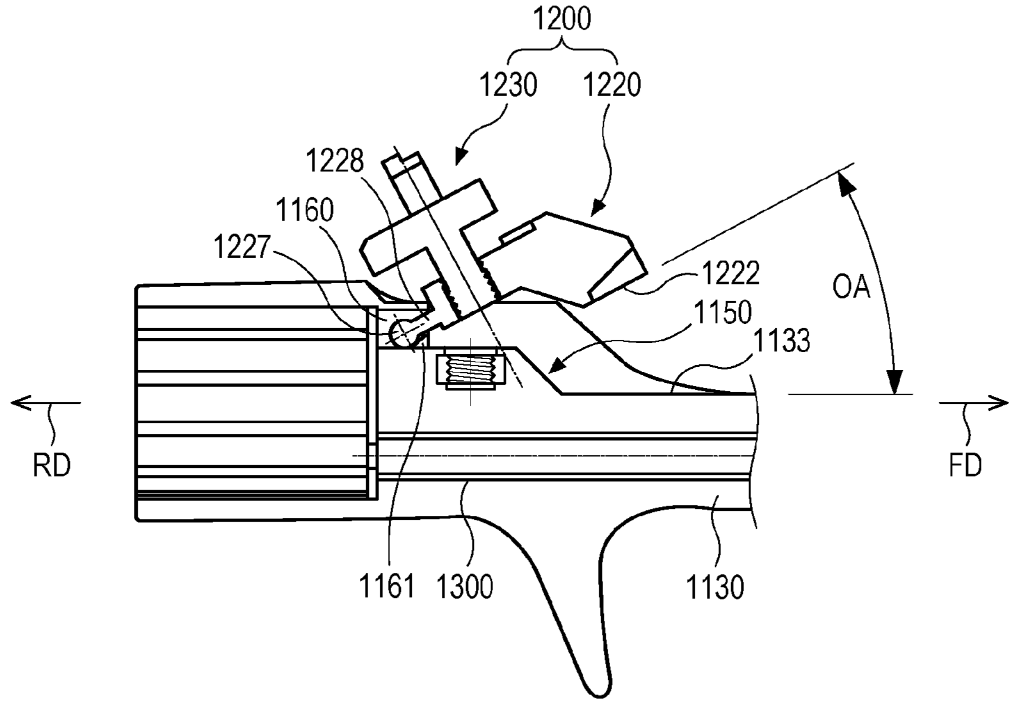
FIG. 36 is a cross-sectional view showing a second example of the processes where the pressing mechanism is separated from the reel fixing portion according to one embodiment.

FIGS. 35 and 36 sequentially show examples of processes where the pressing mechanism is separated from the reel fixing portion. With reference to FIGS. 16, 35 and 36, the processes of separating the pressing mechanism from the reel fixing portion are described.

To fix the rear leg of the reel to the first seating portion 1133, the pressing screw 1230 is separated from the reel fixing portion 1130 and the second seating portion 1150. For example, as shown in FIG. 35, as the head handle 1235 of the pressing screw is rotated counterclockwise, the shank portion 1237 of the pressing screw can be separated from the fastening hole 1153 of the second seating portion 1150. As shown in FIG. 36, the pressing mechanism 1200 is rotated upward about the rotary shaft portion 1227, and the pressing mechanism 1200 is positioned to the open position where the rear leg of the reel is allowed to be seated on the first seating portion 1133. The rotary shaft portion 1227 is fitted to the slit portion 1160 so as to be movable in the frontward and rearward directions. Therefore, when the pressing mechanism 1200 is rotated to the open position, the rotary shaft portion 1227 can be moved slightly in the frontward direction along the slit portion 1160, and the pressing member 1220 can be rotated upward while being pushed in the frontward direction. The inclined protrusions 1161 can function as a stopper that restrains the rotary shaft portion 1227 from moving outwards from the slit portion 1160.

In the fishing rod handle according to one embodiment, the pressing mechanism 1200 is rotated from the first seating portion 1133 to the open position within a predetermined angle range, so that the pressing member 1220 is opened from the first seating portion 1133. The predetermined angle range can be defined as an included angle between the first seating portion 1133 and a lower end of the pressing member 1220 (e.g., the first lower surface 1222 of the pressing member) when the pressing mechanism 1200 is positioned to the open position. As shown in FIG. 36, when viewing the fishing rod handle from a lateral side thereof, an open angle OA of the pressing member 1220 at the open position may be within a range of more than 0 degrees and equal to or less than 25 degrees with respect to the first seating portion 1133. The protrusion portion 1228 of the pressing member is brought into contact with an upper end of the slit portion 1160 and the rotary shaft portion 1227 of the pressing member is brought into contact with the inclined protrusions 1161, thereby restricting the open angle OA of the pressing member 1220. Since the pressing member 1220 is opened upward by the rotation of the pressing mechanism, reels having variously-sized legs can be attached to the fishing rod handle according to one embodiment.

Figure 37:
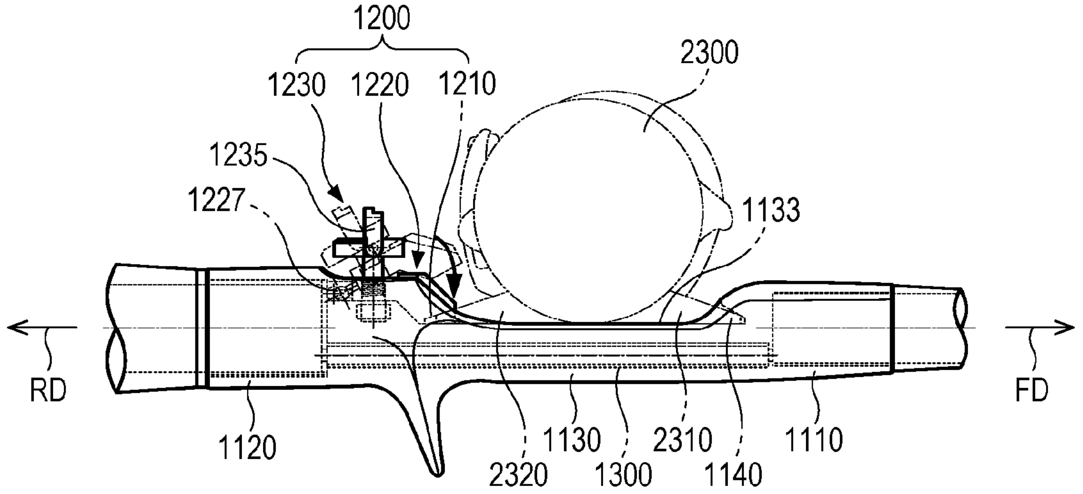
FIG. 37 is a side view showing a first example of processes where a reel is attached to the fishing rod handle according to one embodiment.
Figure 38:
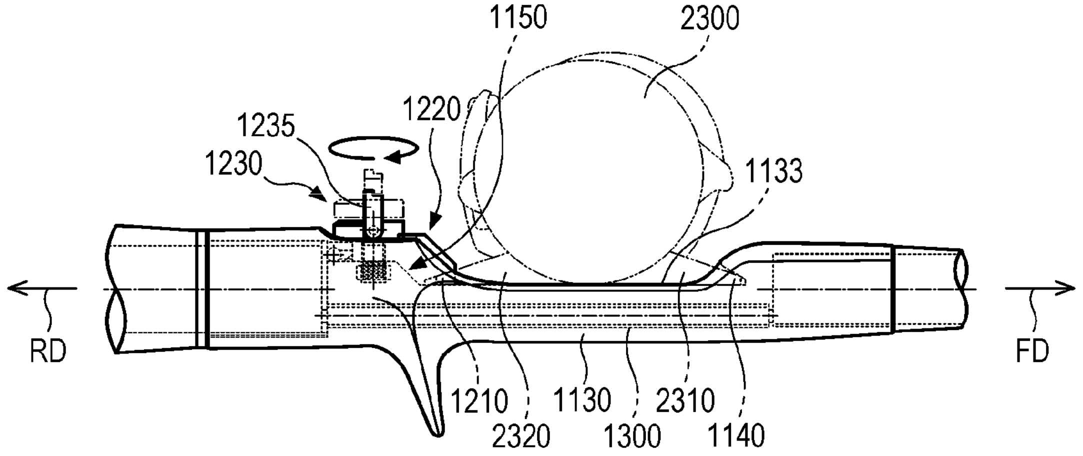
FIG. 38 is a side view showing a second example of the processes where the reel is attached to the fishing rod handle according to one embodiment.
Figure 39:
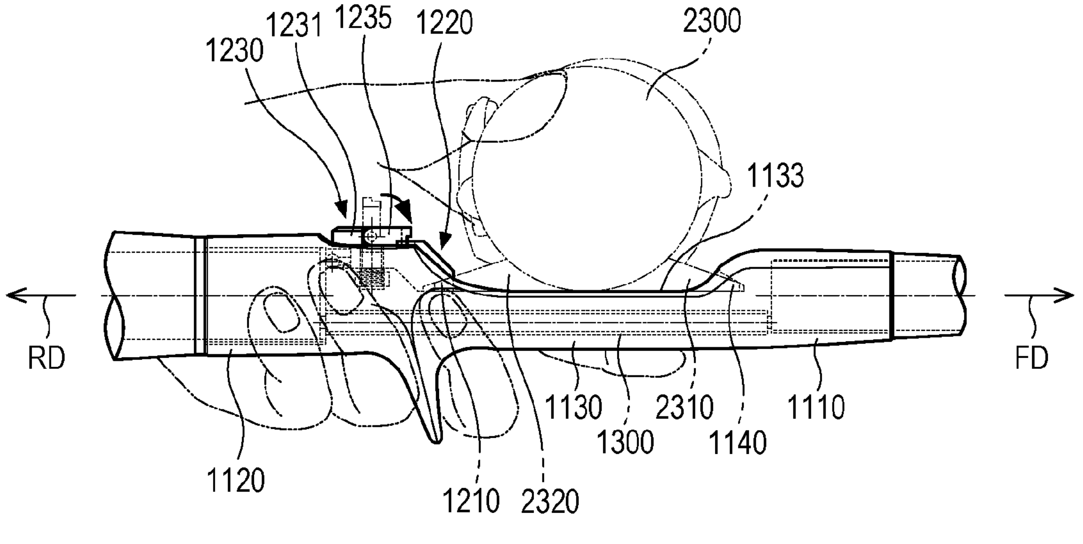
FIG. 39 is a side view showing a third example of the processes where the reel is attached to the fishing rod handle according to one embodiment.

With reference to FIGS. 37 to 39, processes of attaching a reel to the fishing rod handle according to one embodiment are described.

Referring to FIG. 37, in the state where the front leg 2310 and the rear leg 2320 are seated on the first seating portion 1133, the reel 2300 is positioned on the reel fixing portion 1130. The front leg 2310 of the reel is inserted into the front hood 1140. The pressing mechanism 1200 is rotated downward about the rotary shaft portion 1227 from the open position to the closed position where the pressing member of the pressing mechanism presses the rear leg 2320 against the first seating portion 1133. Therefore, the rear leg 2320 of the reel is covered by the rear hood 1210 of the pressing mechanism.

Referring to FIG. 38, in the state where the rear leg 2320 of the reel is covered by the rear hood 1210, the pressing screw 1230 is fastened to the second seating portion 1150. For example, as described with reference to FIG. 33, the pressing screw 1230 is fastened to the second seating portion 1150 by the rotation of the head handle 1235. As the pressing screw 1230 is fastened to the second seating portion 1150, the pressing member 1220 presses the rear leg 2320 against the first seating portion 1133 and fixes the rear leg 2320. Referring to FIG. 39, after the pressing screw 1230 is fastened to the reel fixing portion 1130, the head handle 1235 can be positioned on the pressing member 1220 in parallel with the head portion 1231, and an angler can hold the fishing rod handle.

Figure 40:
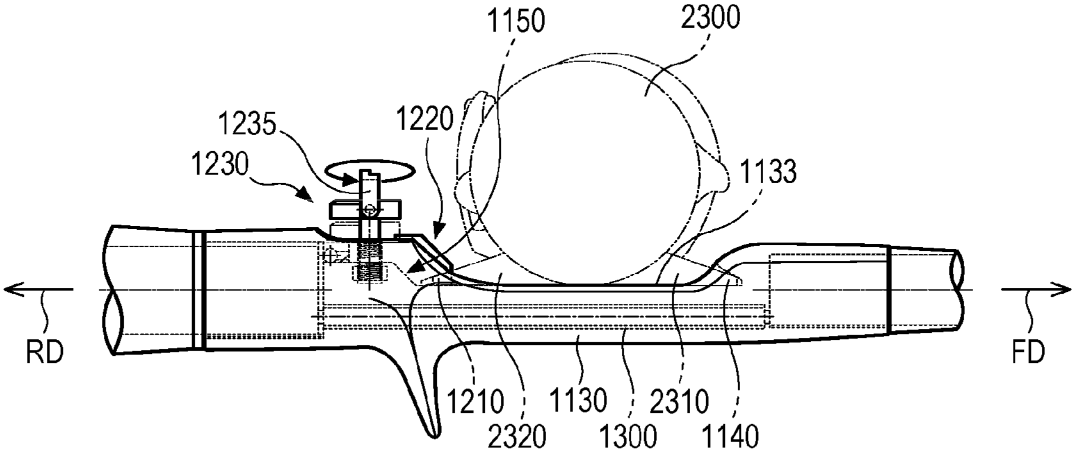
FIG. 40 is a side view showing a first example of processes where the reel is separated from the fishing rod handle according to one embodiment.
Figure 41:
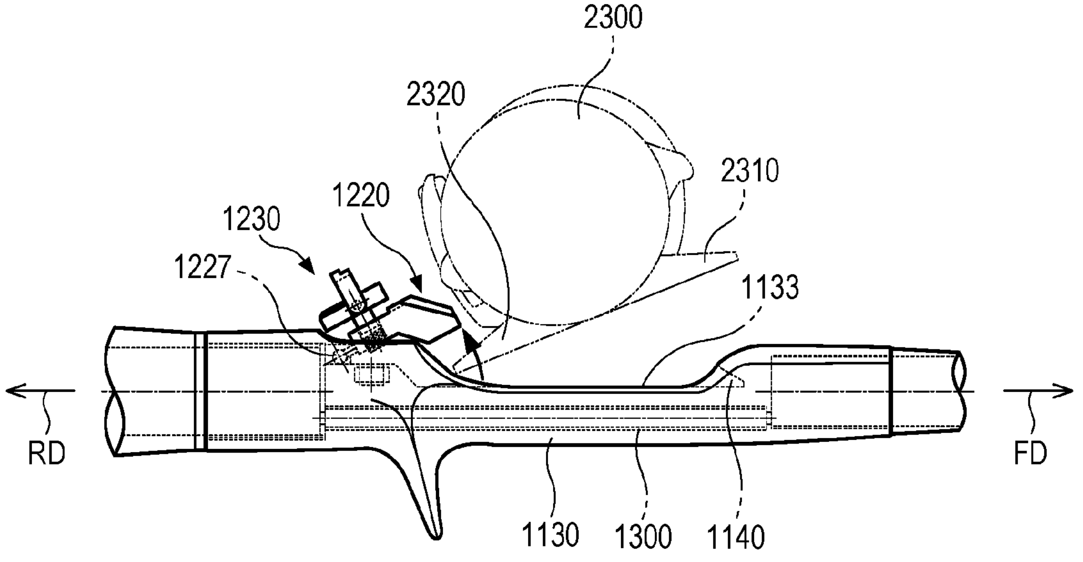
FIG. 41 is a side view showing a second example of the processes where the reel is separated from the fishing rod handle according to one embodiment.

With reference to FIGS. 40 and 41, processes of separating the reel from the fishing rod handle according to one embodiment are described.

Referring to FIG. 40, the pressing screw 1230 can be separated from the reel fixing portion 1130 and the second seating portion 1150 by the rotation of the head handle 1235. Further, the pressing screw 1230 separated from the second seating portion 1150 can be temporarily fixed to the pressing member 1220. Referring to FIG. 41, the pressing mechanism 1200 is rotated to the open position about the rotary shaft portion 1227. Therefore, the fixation of the rear leg 2320 of the reel can be released, and the reel 2300 can be released from the first seating portion 1133 of the reel fixing portion.

Referring to FIGS. 5 and 6, in the above-described embodiment, the front hood 1140 is formed in the vicinity of the front end of the first seating portion 1133, and the pressing mechanism 1200 having the rear hood 1210 is disposed in the vicinity of the rear end of the first seating portion 1133. As another embodiment, the pressing mechanism 1200 may be disposed in the vicinity of the front end of the first seating portion 1133, and the front hood 1140 may be formed in the vicinity of the rear end of the first seating portion 1133. In such an embodiment, the pressing member of the pressing mechanism 1200 can press and fix the front leg of the reel to the first seating portion 1133 by the rear hood 1210, and the front hood 1140 can fix the rear leg of the reel. The position and direction of each component of the fishing rod handle in such an embodiment may be reversed from the position and direction of each component in the above-described embodiment.

Figure 42:
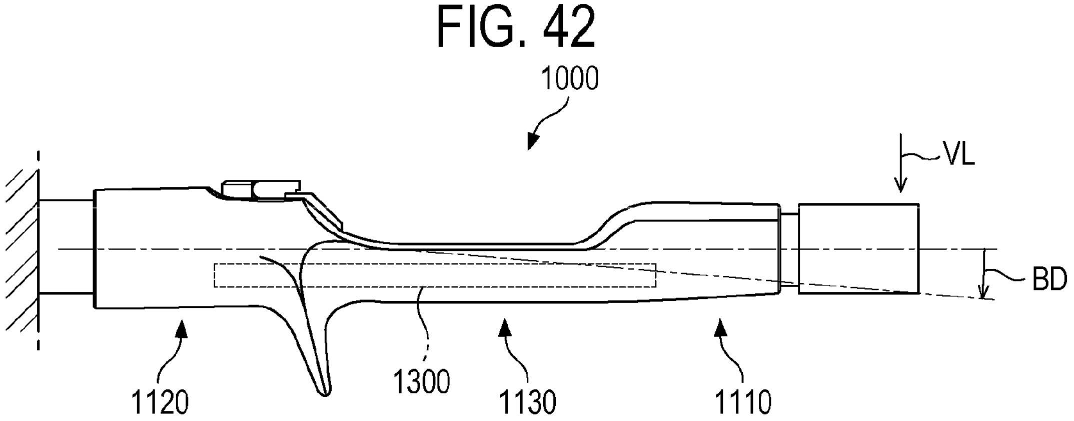
FIG. 42 is a side view illustrating a load test conducted on the fishing rod handle according to one embodiment.

The fishing rod handle according to one embodiment has an improved bending strength due to the reinforcing member embedded in the reel fixing portion along the longitudinal direction. To evaluate the improved bending strength of the fishing rod handle according to one embodiment, a load test was conducted. FIG. 42 is a side view illustrating the load test conducted on the fishing rod handle according to one embodiment.

Referring to FIG. 42, the test example in the load test is the fishing rod handle 1000 according to one embodiment. The fishing rod handle 1000 according to the test example includes the reinforcing member 1300 embedded in the reel fixing portion 1130. In the test example, the reinforcing member 1300 is a reinforcing pipe made of fiber-reinforced plastic. This reinforcing pipe has an outer diameter of 8.0 mm, an inner diameter of 6.5 mm, and a length of 95.4 mm.

The load test was conducted to measure a bending deformation amount (BD) of the fishing rod handle in the state where the rear end of the fishing rod handle (e.g., the rear coupling portion 1120) is fixed and a vertical load (VL) is applied to the front end of the fishing rod handle (e.g., the front coupling portion 1110). In the load test, the magnitude of the vertical load (VL) was 140 Nm, and the test speed was 20 mm/min. In the load test applying the vertical load to the front end of the fishing rod handle, the fishing rod handle 1000 according to the test example showed the bending deformation amount (BD) of about 14.6 mm. However, it was observed through the load test that the reel fixing portion 1130 did not cause any breakage or any change in appearance.

In addition, a load test was conducted on the fishing rod handle according to a comparative example under the same conditions as those of the above load test. The fishing rod handle according to the comparative example is the fishing rod handle shown in FIG. 42, which does not include the reinforcing member. In the load test for the comparative example, the fishing rod handle according to the comparative example showed a bending deformation amount of about 27.7 mm, and breakage was observed in the lower surface of the reel fixing portion. Accordingly, it was confirmed through these load tests that the fishing rod handle 1000 according to one embodiment including the reinforcing member 1300 has an improved bending strength.

The technical idea of the present disclosure has been described heretofore with reference to some embodiments and examples shown in the accompanying drawings. However, it is to be understood that various substitutions, modifications, and alterations may be made without departing from the technical idea and scope of the present disclosure that can be understood by those of ordinary skill in the technical field to which the present disclosure pertains. Further, it is to be understood that such substitutions, modifications, and alterations fall within the scope of the appended claims.

What is claimed is:

1. A fishing rod handle configured to fix a reel having a front leg and a rear leg and to be coupled to a rod body and a rear grip, comprising:

- a front coupling portion including a front coupling hole configured such that the rod body is insertable into and coupleable to the front coupling hole;
- a rear coupling portion spaced apart from the front coupling portion in a longitudinal direction of the fishing rod handle and including a rear coupling hole configured such that the rear grip is insertable into and coupleable to the rear coupling hole;
- a reel fixing portion defined between a rear end of the front coupling hole and a front end of the rear coupling hole and configured to fix the front leg, the reel fixing portion having a first seating portion which is configured such that the front leg and the rear leg are seatable on the first seating portion, and which is spaced downward from an upper side of the front coupling hole and an upper side of the rear coupling hole so as to be offset downward with respect to the upper side of the front coupling hole and the upper side of the rear coupling hole;
- a pressing mechanism located on a rear upper side of the reel fixing portion so as to be adjacent to a rear end of the first seating portion and configured to press and fix the rear leg to the first seating portion; and
- a reinforcing member disposed below the first seating portion, embedded in the reel fixing portion between the rear end of the front coupling hole and the front end of the rear coupling hole, and configured to be continuous in the longitudinal direction and to resist bending deformation of the reel fixing portion, wherein the pressing mechanism is coupled to the reel fixing portion so as to be rotated upward from the first seating portion to an open position where the pressing mechanism allows the rear leg to be seated on the first seating portion and to be rotated to a closed position where the pressing mechanism presses the rear leg to fix the rear leg to the first seating portion, wherein the pressing mechanism includes:

- a pressing member configured to press the rear leg against the first seating portion; and
- a pressing screw passing through the pressing member from top to bottom and fastened to the reel fixing portion to fix the pressing member to the reel fixing portion,
- wherein the pressing member includes:
  - a pressing portion configured to press the rear leg, wherein a passage hole through which the pressing screw passes is perforated through the pressing portion; and
  - a rotary shaft portion disposed in a width direction orthogonal to the longitudinal direction, wherein the reel fixing portion includes:

- a second seating portion on which the pressing member is seated, the second seating portion having a fastening hole into which the pressing screw is fastened, and extending rearward from the first seating portion; and
- a slit portion to which the rotary shaft portion is movably and rotatably fitted, the slit portion located above the second seating portion, and
- wherein the pressing member is coupled to the reel fixing portion so as to be rotatable about the rotary shaft portion between the open position where the pressing portion is spaced upward from the first seating portion and the closed position where the pressing portion presses the rear leg against the first seating portion.

2. The fishing rod handle of claim 1, wherein the reinforcing member is a reinforcing pipe made of fiber-reinforced plastic.

3. The fishing rod handle of claim 1, wherein the reel fixing portion has an insertion hole perforated through the reel fixing portion in the longitudinal direction below the first seating portion, and wherein the reinforcing member is configured to be inserted into and fitted to the insertion hole.

4. The fishing rod handle of claim 1, wherein the reel fixing portion has a front hood formed at a front end of the first seating portion and configured to receive the front leg, wherein the pressing mechanism has a rear hood spaced apart from the front hood in the longitudinal direction and configured to receive the rear leg, and wherein the reinforcing member has a length longer than a distance between a front end of the front hood and a rear end of the rear hood.

5. The fishing rod handle of claim 1, wherein the front coupling hole is formed rearward from a front end of the fishing rod handle and the rear end of the front coupling hole forms a front end surface of the reel fixing portion, wherein the rear coupling hole is formed frontward from a rear end of the fishing rod handle and the front end of the rear coupling hole forms a rear end surface of the reel fixing portion, and wherein the reinforcing member is embedded in the reel fixing portion between the front end surface and the rear end surface, and has a length shorter than a distance between the front end surface and the rear end surface of the reel fixing portion.

6. The fishing rod handle of claim 1, wherein the pressing portion includes:

a first lower surface capable of making contact with the first seating portion;

a second lower surface bent upward with respect to the first lower surface; and a third lower surface in which a lower end of the passage hole is located, the third lower surface bent downward with respect to the second lower surface, and wherein the second seating portion includes:

a first contact surface protruding and extending upward from the first seating portion and capable of making contact complementarily with the second lower surface; and a second contact surface in which an upper end of the fastening hole is located, the second contact surface extending rearward from the first contact surface and capable of making contact complementarily with the third lower surface.

7. The fishing rod handle of claim 1, wherein the fastening hole has a lower end which is spaced upward from the reinforcing member and is closed.

8. The fishing rod handle of claim 1, wherein the pressing screw includes:

a head portion pressing an upper surface of the pressing portion; and a shank portion extending downward from the head portion and coupled to the fastening hole, wherein as the shank portion is coupled to the fastening hole by rotation of the pressing screw, the head portion presses the pressing portion, thereby fixing the pressing member to the reel fixing portion.

9. The fishing rod handle of claim 8, wherein the pressing screw has a head handle which is rotatably coupled to the head portion so as to be manipulated for the rotation of the pressing screw.

10. The fishing rod handle of claim 1, wherein an open angle of the pressing member at the open position is within a range of more than 0 degrees and equal to or less than 25 degrees with respect to the first seating portion.

11. The fishing rod handle of claim 1, wherein the reel fixing portion has a recess which is recessed downward from an upper side of the front coupling portion and an upper side of the rear coupling portion and accommodates the pressing mechanism.

12. The fishing rod handle of claim 1, wherein the front coupling portion, the rear coupling portion, and the reel fixing portion are integrally formed and are made of thermoplastic resin.

13. A fishing rod, comprising:

a rod body;

a fishing rod handle coupled to a rear end of the rod body and configured to fix a reel having a front leg and a rear leg; and a rear grip coupled to a rear end of the fishing rod handle, wherein the fishing rod handle comprises:

a front coupling portion including a front coupling hole configured such that the rod body is inserted into and coupled to the front coupling hole;

a rear coupling portion spaced apart from the front coupling portion in a longitudinal direction of the fishing rod handle and including a rear coupling hole configured such that the rear grip is inserted into and coupled to the rear coupling hole;

a reel fixing portion defined between a rear end of the front coupling hole and a front end of the rear coupling hole and configured to fix the front leg, the reel fixing portion having a first seating portion which is configured such that the front leg and the rear leg are seated on the first seating portion, and which is spaced downward from an upper side of the front coupling hole and an upper side of the rear coupling hole so as to be offset downward with respect to the upper side of the front coupling hole and the upper side of the rear coupling hole;

a pressing mechanism located on a rear upper side of the reel fixing portion so as to be adjacent to a rear end of the first seating portion and configured to press and fix the rear leg to the first seating portion; and a reinforcing member disposed below the first seating portion, embedded in the reel fixing portion between the rear end of the front coupling hole and the front end of the rear coupling hole, and configured to be continuous in the longitudinal direction and to resist bending deformation of the reel fixing portion, wherein the pressing mechanism is coupled to the reel fixing portion so as to be rotated upward from the first seating portion to an open position where the pressing mechanism allows the rear leg to be seated on the first seating portion and to be rotated to a closed position where the pressing mechanism presses the rear leg to fix the rear leg to the first seating portion, wherein the pressing mechanism includes:

a pressing member configured to press the rear leg against the first seating portion; and a pressing screw passing through the pressing member from top to bottom and fastened to the reel fixing portion to fix the pressing member to the reel fixing portion, wherein the pressing member includes:

a pressing portion configured to press the rear leg, wherein a passage hole through which the pressing screw passes is perforated through the pressing portion; and a rotary shaft portion disposed in a width direction orthogonal to the longitudinal direction, wherein the reel fixing portion includes:

a second seating portion on which the pressing member is seated, the second seating portion having a fastening hole into which the pressing screw is fastened, and extending rearward from the first seating portion; and a slit portion to which the rotary shaft portion is movably and rotatably fitted, the slit portion located above the second seating portion, and wherein the pressing member is coupled to the reel fixing portion so as to be rotatable about the rotary shaft portion between the open position where the pressing portion is spaced upward from the first seating portion and the closed position where the pressing portion presses the rear leg against the first seating portion.

* * * * *